US012795515B2

(12) United States Patent
Han et al.

(10) Patent No.: US 12,795,515 B2
(45) Date of Patent: Nov. 10, 2026

(54) ELECTRONIC DEVICE FOR BROADCASTING ADVERTISEMENT PACKETS TOGETHER WITH COUNTERPART ELECTRONIC DEVICE, AND OPERATING METHOD THEREOF

(71) Applicant: Samsung Electronics Co., Ltd., Suwon-si (KR)

(72) Inventors: Euibum Han, Suwon-si (KR); Gupil Cheong, Suwon-si (KR); Doosu Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 660 days.

(21) Appl. No.: 18/354,977

(22) Filed: Jul. 19, 2023

(65) Prior Publication Data

US 2023/0362795 A1 Nov. 9, 2023

Related U.S. Application Data

(63) Continuation of application No. PCT/KR2022/001205, filed on Jan. 24, 2022.

(30) Foreign Application Priority Data

Jan. 29, 2021 (KR) ........................ 10-2021-0013050

(51) Int. Cl.
*H04N 21/234* (2011.01)
*H04N 21/2365* (2011.01)
(Continued)

(52) U.S. Cl.
CPC ....... *H04W 48/10* (2013.01); *H04W 56/0045* (2013.01)

(58) Field of Classification Search
None
See application file for complete search history.

(56) References Cited

U.S. PATENT DOCUMENTS 8,327,178 B2 12/2012 Vandwalle et al.
8,533,507 B2 9/2013 Vandwalle et al.
(Continued)

FOREIGN PATENT DOCUMENTS

JP 2015521425 A * 7/2015 ............ H04W 72/23
KR 10-2012-0094946 A 8/2012
(Continued)

OTHER PUBLICATIONS

English translation of foreign prior art KR 20200001109 A. (Year: 2020).*
(Continued)

*Primary Examiner* — Mohammed Rachedine
(74) *Attorney, Agent, or Firm* — Jefferson IP Law, LLP

(57) ABSTRACT

An electronic device is provided. The electronic device includes a communication module which communicates with a counterpart electronic device through a wireless link, a processor, and a memory in which instructions are stored, wherein the processor is configured to, when the instructions are executed by the processor, identify, based on first device information about the electronic device and second device information from the counterpart electronic device, a first broadcast period of a first advertisement packet and a first timing offset with respect to a reference broadcast time point, and broadcast the first advertisement packet every first transmission period from a time point according to the first timing offset from the reference broadcast time point, wherein the reference broadcast time point is a reference time point synchronized between the electronic device and the counterpart electronic device, and the first timing offset prevents a first broadcast time point of the first advertise-
(Continued)

100 ment packet from overlapping a second broadcast time point of a second advertisement packet of the counterpart electronic device.

17 Claims, 14 Drawing Sheets

(51) Int. Cl.

| | |
|---|---|
| ***H04N 21/434*** | (2011.01) |
| ***H04N 21/44*** | (2011.01) |
| ***H04N 21/81*** | (2011.01) |
| ***H04N 21/845*** | (2011.01) |
| ***H04W 48/10*** | (2009.01) |
| ***H04W 56/00*** | (2009.01) |

(56) References Cited

U.S. PATENT DOCUMENTS

| | | | | |
|---|---|---|---|---|
| 9,179,254 | B1* | 11/2015 | Viswanadham | H04W 4/80 |
| 9,414,426 | B2 | 8/2016 | Park et al. | |
| 9,462,623 | B2 | 10/2016 | Jakusovszky et al. | |
| 10,206,039 | B1 | 2/2019 | Yun et al. | |
| 10,230,596 | B2 | 3/2019 | Jakusovszky et al. | |
| 10,349,259 | B2 | 7/2019 | Watson et al. | |
| 10,438,467 | B2 | 10/2019 | Choe et al. | |
| 10,492,055 | B2 | 11/2019 | Ko | |
| 10,834,567 | B2 | 11/2020 | Watson et al. | |
| 10,834,738 | B2 | 11/2020 | Paycher et al. | |
| 11,166,140 | B2 | 11/2021 | Cheong et al. | |
| 11,405,935 | B2 | 8/2022 | Paycher et al. | |
| 11,533,664 | B2 | 12/2022 | Lee et al. | |
| 2013/0301420 | A1* | 11/2013 | Zhang | H04B 1/56 370/328 |
| 2014/0056234 | A1* | 2/2014 | Hedlund | H04L 41/0823 370/329 |
| 2014/0059369 | A1 | 2/2014 | Vandwalle et al. | |
| 2015/0230285 | A1 | 8/2015 | Park et al. | |
| 2015/0351038 | A1* | 12/2015 | Dooley | H04W 48/10 455/41.2 |
| 2015/0358777 | A1 | 12/2015 | Gupta | |
| 2016/0094921 | A1* | 3/2016 | Chen | H04R 25/558 381/315 |
| 2018/0091965 | A1 | 3/2018 | Watson et al. | |
| 2018/0352558 | A1 | 12/2018 | Paycher et al. | |
| 2018/0359627 | A1 | 12/2018 | Ko | |
| 2020/0037157 | A1* | 1/2020 | Agarwal | H04W 12/106 |
| 2020/0043311 | A1 | 2/2020 | Choe et al. | |
| 2020/0288292 | A1 | 9/2020 | Cheong et al. | |
| 2020/0296793 | A1 | 9/2020 | Cheong et al. | |
| 2022/0053310 | A1 | 2/2022 | Cheong et al. | |
| 2022/0141893 | A1 | 5/2022 | Choi et al. | |
| 2023/0034509 | A1* | 2/2023 | Kessler | A47L 15/0055 |

FOREIGN PATENT DOCUMENTS

| | | | | |
|---|---|---|---|---|
| KR | 10-2015-0094039 | A | 8/2015 | |
| KR | 1579871 | B1 | 12/2015 | |
| KR | 10-2016-0014538 | A | 2/2016 | |
| KR | 10-2017-0013285 | A | 2/2017 | |
| KR | 10-2017-0143431 | A | 12/2017 | |
| KR | 10-2019-0016802 | A | 2/2019 | |
| KR | 10-2020-0001109 | A | 1/2020 | |
| KR | 20200001109 | A * | 1/2020 | H04W 88/10 |
| KR | 10-2020-0106742 | A | 9/2020 | |
| KR | 10-2020-0106743 | A | 9/2020 | |
| KR | 10-2020-0110086 | A | 9/2020 | |
| KR | 20200106742 | A * | 9/2020 | H04W 76/14 |
| KR | 10-2020-0144759 | A | 12/2020 | |
| KR | 20200144759 | A * | 12/2020 | H04W 76/14 |

OTHER PUBLICATIONS

Korean Office Action dated Jul. 1, 2025, issued in a Korean Patent Application No. 10-2021-0013050.

International Search Report dated May 19, 2022, issued in an International Application No. PCT/KR2022/001205.

Korean Notice of Allowance dated Oct. 1, 2025, issued in a Korean Patent Application No. 10-2021-0013050.

* cited by examiner

ELECTRONIC DEVICE FOR BROADCASTING ADVERTISEMENT PACKETS TOGETHER WITH COUNTERPART ELECTRONIC DEVICE, AND OPERATING METHOD THEREOF

CROSS-REFERENCE TO RELATED APPLICATION(S)

This application is a continuation application, claiming priority under § 365(c), of an International application No. PCT/KR2022/001205, filed on Jan. 24, 2022, which is based on and claims the benefit of a Korean patent application number 10-2021-0013050, filed on Jan. 29, 2021, in the Korean Intellectual Property Office, the disclosure of which is incorporated by reference herein in its entirety.

BACKGROUND

1. Field

The disclosure relates to an electronic device for broadcasting advertisement packets together with a counterpart electronic device and an operating method thereof.

2. Description of Related Art

A Bluetooth technology standard regulated by the Bluetooth special interest group (SIG) defines a protocol for short range wireless communication between electronic devices. In a Bluetooth network environment, electronic devices may transmit or receive data packets including content, such as a text, voice, image, or video at a specified frequency band (e.g., about 2.4 gigahertz (GHz)).

For example, a user equipment (UE), such as a smartphone, a tablet personal computer (PC), a desktop computer, or a laptop computer may transmit data packets to another user equipment or an accessory device. The accessory device may include, for example, at least one of an earphone, a headset, a speaker, a mouse, a keyboard, or a display device.

An electronic device may exchange information with the accessory device through communication connection. When communication is disconnected from the electronic device, the accessory device may broadcast an advertisement signal including identification information of the accessory device to surrounding electronic devices. The surrounding electronic devices that have received the advertisement signal of the accessory device may transmit, to a server, location information together with the identification information of the accessory device according to a state of the accessory device. A user may identify a location where the accessory device was lost by receiving the location information together with the identification information of the accessory device from the server through the electronic device.

The above information is presented as background information only to assist with an understanding of the disclosure. No determination has been made, and no assertion is made, as to whether any of the above might be applicable as prior art with regard to the disclosure.

SUMMARY

When accessory devices are consisted with two or more devices, the two or more devices of the accessory devices may individually broadcast an advertisement packet, or one of the two or more devices may broadcast an advertisement packet.

When the two or more devices broadcast an advertisement packet, each of the two or more devices may independently determine a broadcast interval and/or broadcast intensity. Accordingly, cooperation between the two or more devices may be considered in order to deliver an advertisement packet to surrounding electronic devices.

Aspects of the disclosure are to address at least the above-mentioned problems and/or disadvantages and to provide at least the advantages described below. Accordingly, an aspect of the disclosure is to provide a method for efficiently broadcasting an advertisement packet between two or more devices is required.

Additional aspects will be set forth in part in the description which follows and, in part, will be apparent from the description, or may be learned by practice of the presented embodiments.

In accordance with an aspect of the disclosure, an electronic device is provided. The electronic device includes a communication module that performs communication with a counterpart electronic device via a wireless link, at least one processor, and a memory that stores instructions, wherein the instructions, when executed by the at least one processor, cause the at least one processor to identify a first broadcast interval of a first advertisement packet and a first timing offset from a reference broadcast time point based on first device information of the electronic device and second device information from the counterpart electronic device, and broadcast the first advertisement packet at the first broadcast interval from a time point according to the first timing offset from the reference broadcast time point, wherein the reference broadcast time point is a reference time point synchronized between the electronic device and the counterpart electronic device, and the first timing offset may cause a first broadcast time point of the first advertisement packet and a second broadcast time point of a second advertisement packet of the counterpart electronic device not to overlap with each other.

In accordance with another aspect of the disclosure, a method for operating an electronic device is provided. The method includes identifying a first broadcast interval of a first advertisement packet and a first timing offset from a reference broadcast time point based on first device information of the electronic device and second device information from the counterpart electronic device, and broadcasting the first advertisement packet at the first broadcast interval from a time point according to the first timing offset from the reference broadcast time point, wherein the reference broadcast time point is a reference time point synchronized between the electronic device and the counterpart electronic device, and the first timing offset may cause a first broadcast time point of the first advertisement packet and a second broadcast time point of a second advertisement packet of the counterpart electronic device not to overlap with each other.

In accordance with another aspect of the disclosure, a non-transitory computer-readable recording medium for storing instructions is provided. The non-transitory computer-readable recording medium stores instructions that, when executed by the processor, cause the processor to identify a first broadcast interval of a first advertisement packet and a first timing offset from a reference broadcast time point based on first device information of an electronic device and second device information from a counterpart electronic device, and broadcast the first advertisement packet at the first broadcast interval from a time point according to the first timing offset from the reference broadcast time point, wherein the reference broadcast time point is a reference time point synchronized between the electronic device and the counterpart electronic device, and the first timing offset may cause a first broadcast time point of the first advertisement packet and a second broadcast time point of a second advertisement packet of the counterpart electronic device not to overlap with each other.

According to embodiments of the disclosure, two or more devices determine a broadcast interval and/or broadcast intensity, and thus an advertisement packet can be efficiently broadcast.

The effects obtainable from various embodiments of the disclosure are not limited to the above effects, and other effects that are not mentioned would be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
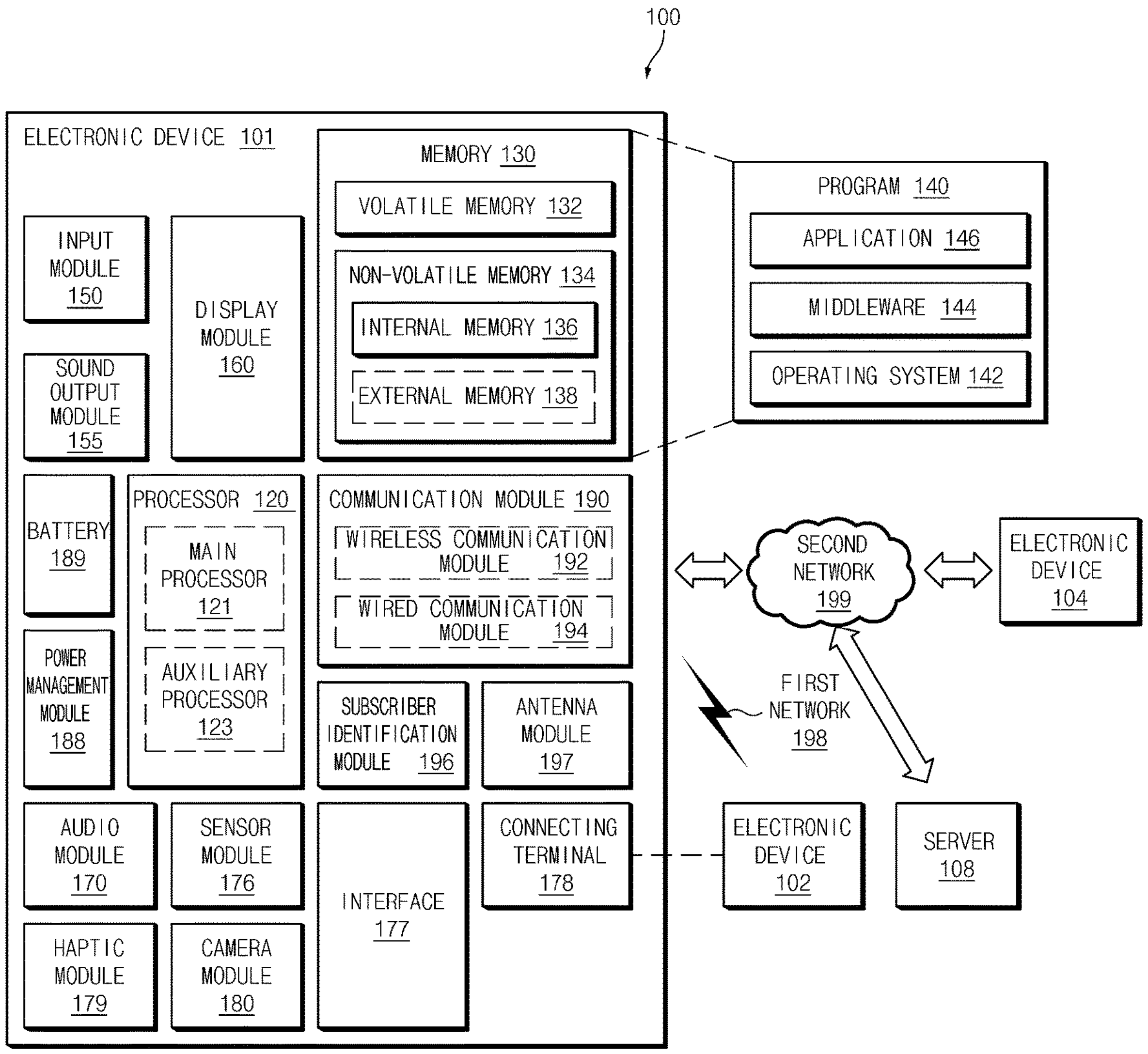
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
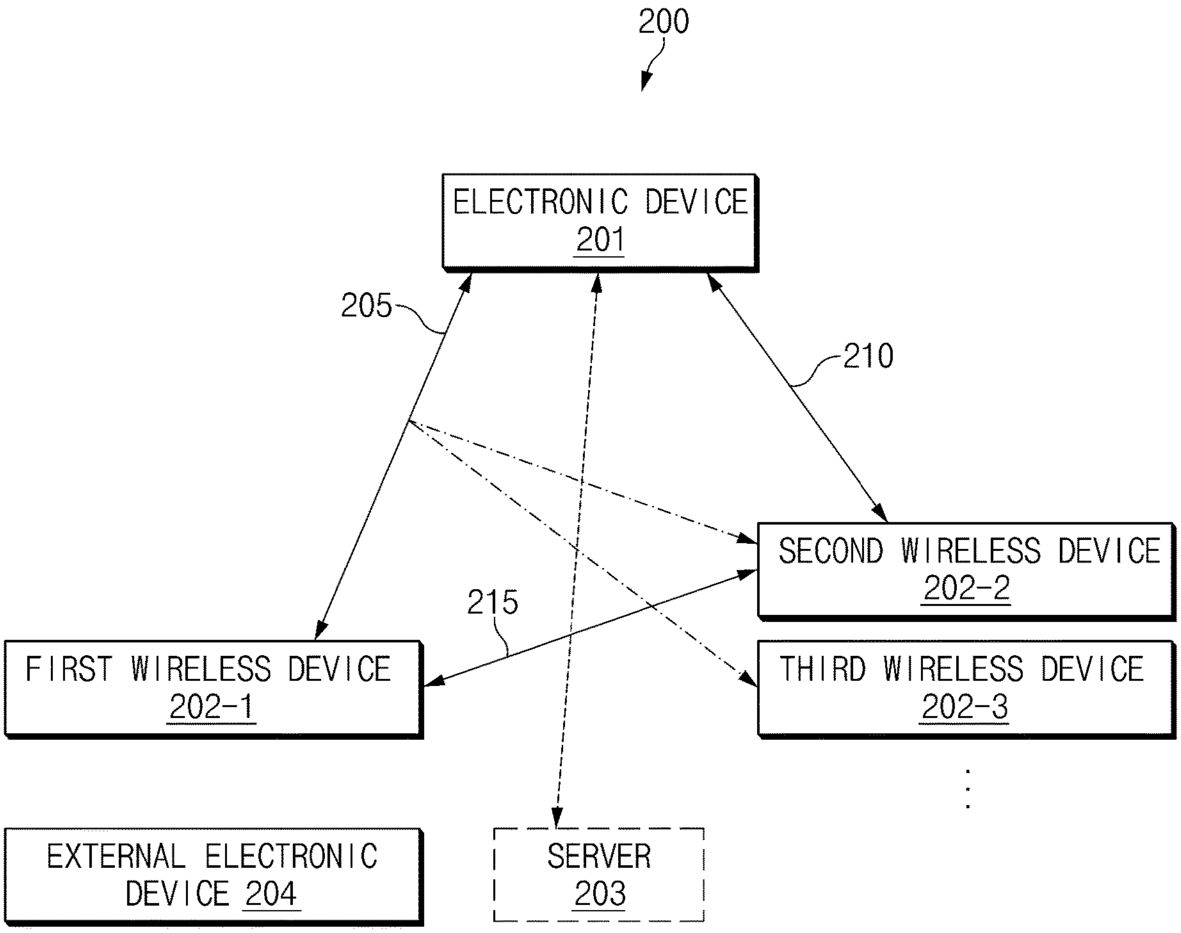
FIG. 2 illustrates a network environment according to an embodiment of the disclosure.

FIG. 2 illustrates a network environment according to an embodiment of the disclosure.

Figure 3:
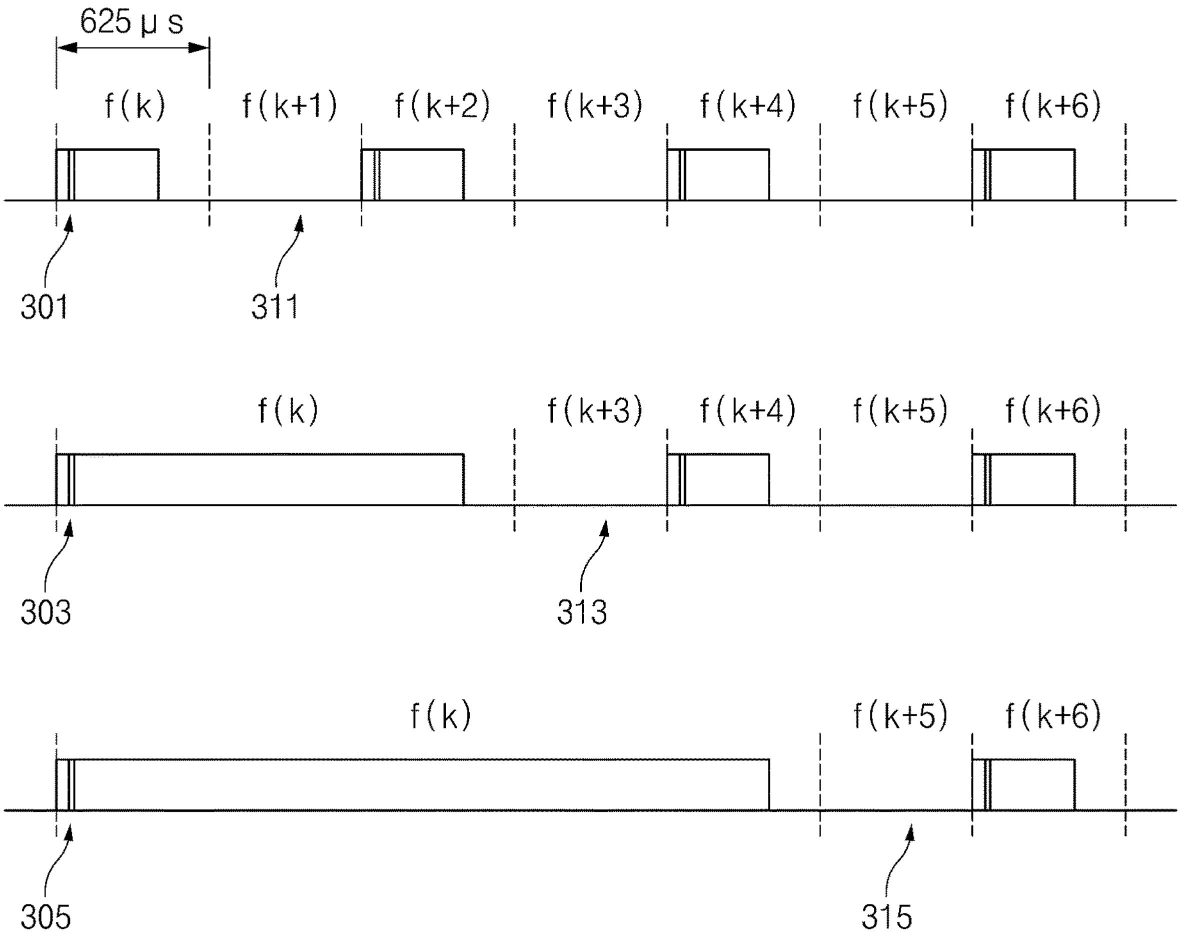
FIG. 3 illustrates slots in a network environment according to an embodiment of the disclosure.

FIG. 3 illustrates slots in a network environment according to an embodiment of the disclosure.

Referring to FIG. 2, a network environment 200 may include an electronic device 201 and one or more wireless devices 202-1, 202-2, and/or 202-3. In an embodiment of the disclosure, the network environment 200 may further include a server 203 and/or an external electronic device 204.

In an embodiment of the disclosure, the electronic device 201 and the one or more wireless devices 202-1, 202-2, and/or 202-3 may include components, at least some of which are the same as or similar to those of the electronic device 101 illustrated in FIG. 1, and may execute functions, at least some of which are the same as or similar to those of the electronic device 101.

In an embodiment of the disclosure, the electronic device 201 and the one or more wireless devices 202-1, 202-2, and/or 202-3 may perform wireless communication at a short range according to a Bluetooth network defined by Bluetooth special interest group (SIG). In an embodiment of the disclosure, the Bluetooth network may include a Bluetooth legacy network or a Bluetooth low energy (BLE) network. In an embodiment of the disclosure, the electronic device 201 and the one or more wireless devices 202-1, 202-2, and/or 202-3 may perform wireless communication via one or both of the Bluetooth legacy network and the BLE network.

In an embodiment of the disclosure, the electronic device 201 may include a terminal, such as a smartphone, tablet PC, desktop computer, or laptop computer. In an embodiment of the disclosure, the one or more wireless devices 202-1, 202-2, and/or 202-3 may include an accessory device, such as an earphone, an earphone case, a headset, a speaker, a mouse, a keyboard, or a display device. For example, the first wireless device 202-1 and the second wireless device 202-2 may be an earphone, and the third wireless device 202-3 may be an earphone case in which the first wireless device 202-1 and the second wireless device 202-2 may be mounted.

In an embodiment of the disclosure, a link (e.g., 205 and/or 210) may be established between the electronic device 201 and the one or more wireless devices 202-1 and/or 202-2. In an embodiment of the disclosure, the electronic device 201 may create a first link 205 with the first wireless device 202-1, and may create a second link 210 with the second wireless device 202-2. In an embodiment of the disclosure, in relation to the first link 205, the electronic device 201 may serve as a master device, and the first wireless devices 202-1 may serve as a slave device. In an embodiment of the disclosure, in relation to the second link 210, the electronic device 201 may serve as a master device, and the second wireless devices 202-2 may serve as a slave device. In an embodiment of the disclosure, during an operation in which a link (e.g., 205 and/or 210) between devices are created, it may be determined which device should serve as a master device or a slave device.

In an embodiment of the disclosure, the master device may control a physical channel. In an embodiment of the disclosure, the master device may initiate transmission of a packet, whereas the slave device may transmit a packet to the master device only after receiving a packet. In an embodiment of the disclosure, the master device may initiate transmission of a packet in a specified slot (e.g., even-numbered slot), and the slave device may initiate transmission of a packet in a specified slot (e.g., odd-numbered slot).

Referring to FIG. 3, the master device may transmit a single-slot packet 301 and/or multi-slot packets 303 and 305. For example, the master device may transmit the single-slot packet 301, the multi-slot packet 303 configured with three slots 313, and the multi-slot packet 305 configured with five slots to the slave device in a k-$^{th}$ slot through a hopping channel having a frequency of f(k). For example, the master device may receive a packet from the slave device in a slot 311 (e.g., (k+1)-$^{th}$ slot, (k+3)-$^{th}$ slot, (k+5)-$^{th}$ slot) next to the slot in which a packet was transmitted. Here, k may be an even natural number.

In an embodiment of the disclosure, a channel resource (e.g., hopping channel) for transmitting a packet may be generated based on a clock of the master device. In an embodiment of the disclosure, in the Bluetooth legacy network, a time resource (e.g., slot) may be determined based on a clock of the master device. In an embodiment of the disclosure, a slot may have a length of 625 μs (microseconds).

In an embodiment of the disclosure, the electronic device 201 may create the first link 205 and/or the second link 210 based on a synchronous connection protocol. The synchronous connection protocol may include a protocol (e.g., protocol that supports hands-free profile (HPF)) that supports real-time audio data exchange. In an embodiment of the disclosure, the electronic device 201 may create the first link 205 and/or the second link 210 based on an asynchronous connection protocol. The asynchronous connection protocol may include a serial port profile (SPP) or a profile (e.g., advanced audio distribution profile (A2DP)) using an asynchronous connection-less (ACL) protocol.

In an embodiment of the disclosure, a third link 215 may be established between the first wireless device 202-1 and the second wireless device 202-2. In an embodiment of the disclosure, in relation to the third link 215, one of the first wireless device 202-1 and the second wireless device 202-2 (e.g., the first wireless device 202-1) may serve as a master device, and the other device (e.g., the second wireless device 202-2) may serve as a slave device. In an embodiment of the disclosure, similarly to the first link and/or the second link 210, the third link 215 may be based on the synchronous connection protocol and/or asynchronous connection protocol.

In an embodiment of the disclosure, the electronic device 201 and the one or more wireless devices 202-1, 202-2, and/or 202-3 may transmit a packet to another electronic device through the link 205, 210, and/or 215. In an embodiment of the disclosure, a packet may include content, such as text, audio, image, or video. In an embodiment of the disclosure, a device transmitting a packet may be referred to as a source device, and a device receiving a packet may be referred to as a sink device.

In an embodiment of the disclosure, the electronic device 201 and the one or more wireless devices 202-1, 202-2, and/or 202-3 may monitor a link in which they are not participating. For example, the second wireless device 202-2 may monitor the first link 205 based on information associated with the first link 205. In an embodiment of the disclosure, when the second wireless device 202-2 monitors the first link 205, the electronic device 201 may be referred to as a device under test (DUT), the first wireless device 202-1 may be referred to as a primary earbud or primary equipment (PE), and the second wireless device 202-2 may be referred to a secondary earbud or secondary equipment (SE). In an embodiment of the disclosure, the information associated with the first link 205 may include address information (e.g., the Bluetooth address of the master device of the first link 205, the Bluetooth address of the electronic device 201, and/or the Bluetooth address of the first wireless device 202-1), piconet (e.g., network environment 200) clock information (e.g., clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information.

Figure 4:
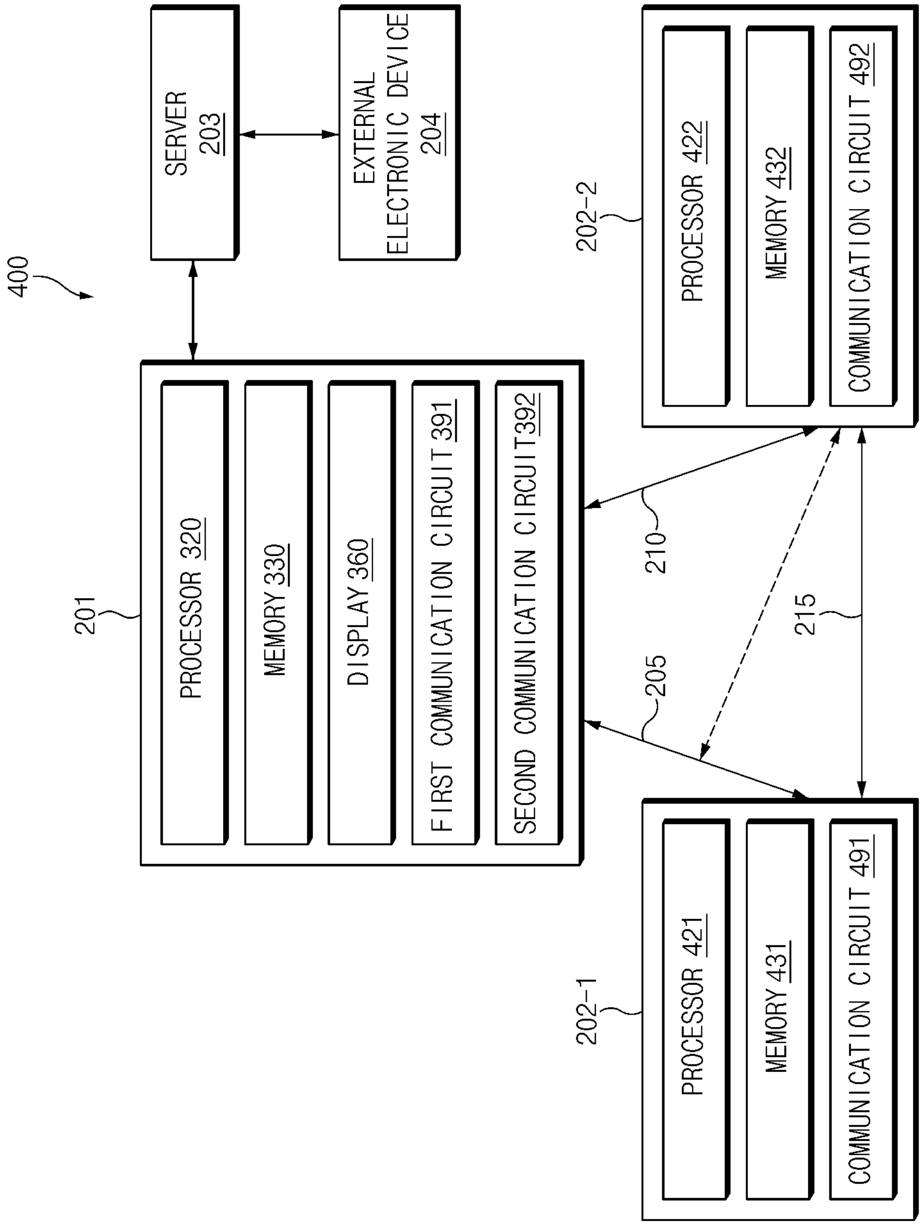
FIG. 4 is a block diagram illustrating electronic devices according to an embodiment of the disclosure.

FIG. 4 is a block diagram 400 illustrating electronic devices according to an embodiment of the disclosure.

FIGS. 5A, 5B, 5C, 5D, and 5E illustrate timing at which a wireless devices broadcast an advertisement packet according to various embodiments of the disclosure.

Referring to FIGS. 5A, 5B, 5C, 5D, and 5E, various electronic devices (e.g., the electronic device 201, the first wireless device 202-1, and the second wireless device 202-2) disclosed in the disclosure may include at least some of the components of the electronic device (e.g., the electronic device 101 of FIG. 1) described above with reference to FIG. 1.

In an embodiment of the disclosure, the electronic device 201 may include a processor 320 (e.g., the processor 120 of FIG. 1), a memory 330 (e.g., the memory 130 of FIG. 1), a display 360 (e.g., the display module 160 of FIG. 1), a first communication circuit 391 (e.g., the communication module 190 of FIG. 1), and/or a second communication circuit 392 (e.g., the communication module 190 of FIG. 1).

In an embodiment of the disclosure, the second communication circuit 392 may be configured to support wireless communication based on a Bluetooth protocol (e.g., legacy Bluetooth and/or BLE). The first communication circuit 391 may be configured to support communication based on a wireless communication standard (e.g., cellular and/or Wi-Fi) other than a Bluetooth protocol.

In an embodiment of the disclosure, the electronic device 201 may be connected to the first wireless device 202-1 via the first link 205. In an embodiment of the disclosure, the electronic device 201 may be connected to the second wireless device 202-2 via the second link 210. For example, the electronic device 201 and the first wireless device 202-1 may communicate in units of slots configured based on a clock of the master device (e.g., electronic device 201) of the first link 205. For example, the electronic device 201 and the second wireless device 202-2 may communicate in units of slots configured based on a clock of the master device (e.g., electronic device 201) of the second link 210. One slot may be configured so that the master device may transmit data to the slave device (e.g., first wireless device 202-1) or the slave device may transmit data to the master device. One slot may have a length of 625 μs. In an embodiment of the disclosure, establishment of a connection between the electronic device 201 and the first wireless device 202-1 and/or the second wireless device 202-2 via the link 205 and/or 210 may indicate that an access code (e.g., channel access code), timing, and frequency of a piconet (e.g., network environment 200) are synchronized. In an embodiment of the disclosure, the access code may be generated based on an address of a master device (e.g., electronic device 201). In an embodiment of the disclosure, synchronization of timing may indicate that a slave device (e.g., first wireless device 202-1 and/or second wireless device 202-2) adjusts its clock through an offset (e.g., slave offset) so as to operate at the same clock as a clock of a master device.

Referring to FIG. 4, in an embodiment of the disclosure, the first wireless device 202-1 may include a processor 421 (e.g., the processor 120 of FIG. 1), a memory 431 (e.g., the memory 130 of FIG. 1), and/or a communication circuit 491 (e.g., the communication module 190 of FIG. 1). In an embodiment of the disclosure, the second wireless device 202-2 may include a processor 422 (e.g., the processor 120 of FIG. 1), a memory 432 (e.g., the memory 130 of FIG. 1), and/or a communication circuit 492 (e.g., the communication module 190 of FIG. 1).

In an embodiment of the disclosure, the communication circuit 491 of the first wireless device 202-1 may be configured to support wireless communication based on a Bluetooth protocol (e.g., legacy Bluetooth and/or BLE). In an embodiment of the disclosure, the communication circuit 492 of the second wireless device 202-2 may be configured to support wireless communication based on a Bluetooth protocol (e.g., legacy Bluetooth and/or BLE).

In an embodiment of the disclosure, the first wireless device 202-1 and the second wireless device 202-2 may be connected via the third link 215. For example, the first wireless device 202-1 may establish the third link 215 with the second wireless device 202-2. In an embodiment of the disclosure, the first wireless device 202-1 and the second wireless device 202-2 may establish the third link 215 if a specified condition is satisfied. For example, when a link (e.g., first link 205 and/or second link 210) with the electronic device 201 is released, the third link 215 may be established. For example, when a packet is not transmitted and/or received via a link (e.g., first link 205 and/or second link 210) with the electronic device 201, the third link 215 may be established. For example, in the case of being detached from a case (e.g., third wireless device 202-3), the third link 215 may be established. For example, when the first wireless device 202-1 and/or the second wireless device 202-2 is not worn by a user, the third link 215 may be established. For example, when a charged amount of a battery of the first wireless device 202-1 and/or a charged amount of a battery of the second wireless device 202-2 is equal to or less than a specified charged amount, the third link 215 may be established.

In an embodiment of the disclosure, establishment of a connection between the first wireless device 202-1 and the second wireless device 202-2 via the third link 215 may indicate that an access code (channel access code), timing, and frequency of a piconet are synchronized. In an embodiment of the disclosure, the access code may be generated based on an address of a master device (e.g., first wireless device 202-1). In an embodiment of the disclosure, synchronization of timing may indicate that a slave device (e.g., second wireless device 202-2) adjusts its clock through an offset (e.g., slave offset) so as to operate at the same clock as a clock of a master device (e.g., first wireless device 202-1).

In an embodiment of the disclosure, the first wireless device 202-1 and the second wireless device 202-2 may communicate in units of slots configured based on a clock of the master device (e.g., first wireless device 202-1) of the third link 215.

In an embodiment of the disclosure, the first wireless device 202-1 and the second wireless device 202-2 may exchange (or share) device information via the third link 215. In an embodiment of the disclosure, the first wireless device 202-1 may transmit first device information of the first wireless device 202-1 to the second wireless device 202-2 via the third link 215. In an embodiment of the disclosure, the second wireless device 202-2 may transmit second device information of the second wireless device 202-2 to the first wireless device 202-1 via the third link 215. In an embodiment of the disclosure, the device information may include battery information (e.g., charged amount), received signal strength, time information (e.g., timing, connection interval), or a combination thereof. In an embodiment of the disclosure, the received signal strength may indicate received signal strength of a packet via the third link 215. In an embodiment of the disclosure, the timing information may indicate offset information for synchronizing a clock of a slave device with a clock of a master device. In an embodiment of the disclosure, the connection interval may include information for identifying release of a link. In an embodiment of the disclosure, the connection interval may include information for identifying a packet transmission interval via a link.

In an embodiment of the disclosure, the first wireless device 202-1 and the second wireless device 202-2 may transmit the device information to a counterpart wireless device based on a change in the device information.

In an embodiment of the disclosure, if the battery information (e.g., charged amount) is changed after transmitting previous device information, the first wireless device 202-1 may transmit the device information to the second wireless device 202-2. In an embodiment of the disclosure, if a charged amount of a battery reduces by as much as a specified charged amount (e.g., 10%) after transmitting previous device information, the first wireless device 202-1 may transmit the device information to the second wireless device 202-2. In an embodiment of the disclosure, similarly to the first wireless device 202-1, the second wireless device 202-2 may transmit the device information to the first wireless device 202-1 if the battery information (e.g., charged amount) is changed after transmitting previous device information.

In an embodiment of the disclosure, if the received signal strength is changed after transmitting previous device information, the first wireless device 202-1 may transmit the device information to the second wireless device 202-2. In an embodiment of the disclosure, if the received signal strength reduces by as much as specified strength (e.g., 5 dBm) after transmitting previous device information, the first wireless device 202-1 may transmit the device information to the second wireless device 202-2. In an embodiment of the disclosure, similarly to the first wireless device 202-1, the second wireless device 202-2 may transmit the device information to the first wireless device 202-1 if the received signal strength is changed after transmitting previous device information.

In an embodiment of the disclosure, if a distance is changed (e.g., distance increases) after transmitting previous device information, the first wireless device 202-1 may transmit the device information to the second wireless device 202-2. In an embodiment of the disclosure, the distance may be a distance between the first wireless device 202-1 and the second wireless device 202-2. In an embodiment of the disclosure, the distance may be identified based on the received signal strength.

In an embodiment of the disclosure, if the time information is changed after transmitting previous device information, the first wireless device 202-1 may transmit the device information to the second wireless device 202-2. In an embodiment of the disclosure, if the timing information is initialized and/or changed after transmitting previous device information, the first wireless device 202-1 may transmit the device information to the second wireless device 202-2. In an embodiment of the disclosure, if the connection interval is initialized and/or changed after transmitting previous device information, the first wireless device 202-1 may transmit the device information to the second wireless device 202-2. In an embodiment of the disclosure, similarly to the first wireless device 202-1, the second wireless device 202-2 may transmit the device information to the first wireless device 202-1 if the time information is changed after transmitting previous device information.

In an embodiment of the disclosure, the first wireless device 202-1 and the second wireless device 202-2 may transmit the device information to a counterpart wireless device at a specified interval.

In an embodiment of the disclosure, the first wireless device 202-1 and/or the second wireless device 202-2 may identify a loss situation. In an embodiment of the disclosure, the first wireless device 202-1 and/or the second wireless device 202-2 may identify a loss situation based on a connection interval for a link (e.g., first link 205, second link 210) with the electronic device 201. In an embodiment of the disclosure, the loss situation may be a situation in which it is determined that the user of the electronic device 201 has lost the first wireless device 202-1 and/or the second wireless device 202-2.

In an embodiment of the disclosure, the first wireless device 202-1 may identify release of the first link 205 based on a connection interval for the first link 205. In an embodiment of the disclosure, the first wireless device 202-1 may identify, as the loss situation, a situation in which the first link 205 is released.

In an embodiment of the disclosure, the second wireless device 202-2 may identify release of the second link 210 based on a connection interval for the second link 210. In an embodiment of the disclosure, the second wireless device 202-2 may identify, as the loss situation, a situation in which the second link 210 is released.

In an embodiment of the disclosure, the first wireless device 202-1 and the second wireless device 202-2 may identify, as the loss situation, a situation in which one of the first link 205 and the second link 210 is released. In an embodiment of the disclosure, the first wireless device 202-1 and the second wireless device 202-2 may identify, as the loss situation, a situation in which both the first link 205 and the second link 210 are released.

In an embodiment of the disclosure, the first wireless device 202-1 and the second wireless device 202-2 may identify, as the loss situation, a situation in which a specified time has elapsed after the first link 205 and/or the second link 210 is released.

In an embodiment of the disclosure, the first wireless device 202-1 and the second wireless device 202-2 may identify, as the loss situation, a situation in which the charged amount of a battery of at least one wireless device (e.g., first wireless device 202-1) among the first wireless device 202-1 and the second wireless device 202-2 is equal to or less than a specified charged amount after the first link 205 and/or the second link 210 is released.

In an embodiment of the disclosure, the first wireless device 202-1 and the second wireless device 202-2 may identify, as the loss situation, a situation in which charging power is not supplied from the outside (e.g., case for the first wireless device 202-1 and/or the second wireless device 202-2) for a specified time after the first link 205 and/or the second link 210 is released.

In an embodiment of the disclosure, the first wireless device 202-1 and the second wireless device 202-2 may identify, as the loss situation, a situation in which they are not electrically connected to the outside (e.g., case for the first wireless device 202-1 and/or the second wireless device 202-2) for a specified time after the first link 205 and/or the second link 210 is released.

In an embodiment of the disclosure, the first wireless device 202-1 and the second wireless device 202-2 may identify an advertisement scheme. In an embodiment of the disclosure, the first wireless device 202-1 and the second wireless device 202-2 may identify the advertisement scheme if the loss situation is identified. In an embodiment of the disclosure, one device (e.g., master device (e.g., first wireless device 202-1)) among the first wireless device 202-1 and the second wireless device 202-2 may identify the advertisement scheme, and may transmit the identified advertisement scheme to another device (e.g., slave device (e.g., second wireless device 202-2)). In an embodiment of the disclosure, the first wireless device 202-1 and the second wireless device 202-2 each may identify the advertisement scheme.

In an embodiment of the disclosure, identification of the advertisement scheme may indicate that broadcast execution device information, broadcast interval information, broadcast frequency information, and/or broadcast intensity information of the first wireless device 202-1 and/or the second wireless device 202-2 are identified.

In an embodiment of the disclosure, the broadcast execution device information may indicate at least one device to execute broadcast among the first wireless device 202-1 and the second wireless device 202-2. For example, the broadcast execution device information may indicate that only one device (e.g., first wireless device 202-1) among the first wireless device 202-1 and the second wireless device 202-2 executes broadcast. For example, the broadcast execution device information may indicate that both the first wireless device 202-1 and the second wireless device 202-2 execute broadcast. In an embodiment of the disclosure, when the distance between the first wireless device 202-1 and the second wireless device 202-2 is within a specified distance, the broadcast execution device information may indicate that only one device executes broadcast. In an embodiment of the disclosure, when the distance between the first wireless device 202-1 and the second wireless device 202-2 is less than the specified distance, the broadcast execution device information may indicate that both the two devices execute broadcast. In an embodiment of the disclosure, the distance between the first wireless device 202-1 and the second wireless device 202-2 may be identified based on received signal strength.

In an embodiment of the disclosure, the broadcast interval information may indicate an interval between anchor points and/or a timing offset from an anchor point. In an embodiment of the disclosure, the anchor point may be a clock (or slot) configured for periodically broadcasting an advertisement packet. In an embodiment of the disclosure, the anchor point may be referred to as a reference broadcast time point. In an embodiment of the disclosure, the timing offset may be a value for identifying a clock for broadcasting an advertisement packet after the anchor point.

In an embodiment of the disclosure, the broadcast frequency information may indicate a ratio between a count of broadcasting of the first wireless device 202-1 and a count of broadcasting of the second wireless device 202-2. For example, when the broadcast frequency is 2:1, the first wireless device 202-1 may execute broadcast for each anchor point, whereas the second wireless device 202-2 may execute broadcast for half of anchor points.

Figure 5A:
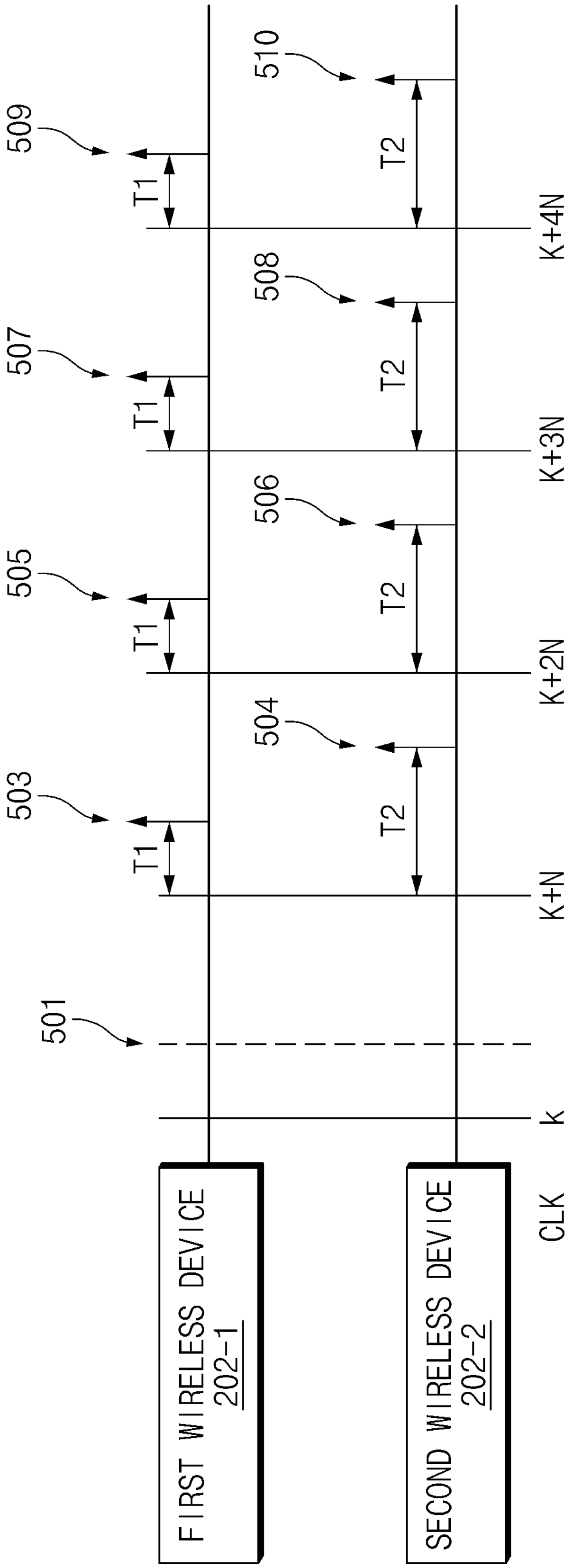
FIGS. 5A, 5B, 5C, 5D, and 5E illustrate timing at which wireless devices broadcast an advertisement packet according to various embodiments of the disclosure.

Referring to FIG. 5A, the first wireless device 202-1 and the second wireless device 202-2 may identify occurrence of the loss situation at a time point 501. In an embodiment of the disclosure, if the occurrence of the loss situation is identified, the first wireless device 202-1 and the second wireless device 202-2 may identify the advertisement scheme.

In an embodiment of the disclosure, a broadcast execution device may be both the first wireless device 202-1 and the second wireless device 202-2. In an embodiment of the disclosure, a reference anchor point may be a k-$^{th}$ clock. In an embodiment of the disclosure, the interval between anchor points may be N clocks. In an embodiment of the disclosure, the timing offset of the first wireless device 202-1 may be T1. The timing offset of the second wireless device 202-2 may be T2. In an embodiment of the disclosure, the first wireless device 202-1 and the second wireless device 202-2 may have the same broadcast frequency (e.g., 1:1).

Referring to FIG. 5A, the first wireless device 202-1 may broadcast advertisement packets 503, 505, 507, and 509 at a clock after the specified timing offset T1 from anchor points (every N-$^{th}$ clock from k-$^{th}$ clock (e.g., k+N, k+2N, k+3N, k+4N)). In an embodiment of the disclosure, the second wireless device 202-2 may broadcast advertisement packets 504, 506, 508, and 510 at a clock after the specified timing offset T2 from anchor points (every N-$^{th}$ clock from k-$^{th}$ clock (e.g., k+N, k+2N, k+3N, k+4N)).

Although FIG. 5A illustrates that the first wireless device 202-1 broadcasts four advertisement packets 503, 505, 507, and 509, and the second wireless device 202-2 broadcasts four advertisement packets 504, 506, 508, and 510, this is merely an example. In an embodiment of the disclosure, the first wireless device 202-1 and the second wireless device 202-2 may periodically broadcast an advertisement packet until a specified condition is satisfied. In an embodiment of the disclosure, the specified condition may include discharging of a battery (or charged amount being equal to or less than a specified charged amount), settlement of the loss situation (e.g., reestablishment of a link with the electronic device 201), reconfiguration of the advertisement scheme, expiration of a specified broadcast time, or a combination thereof. In an embodiment of the disclosure, the advertisement scheme may be reconfigured based on a change in the device information.

Figure 5B:
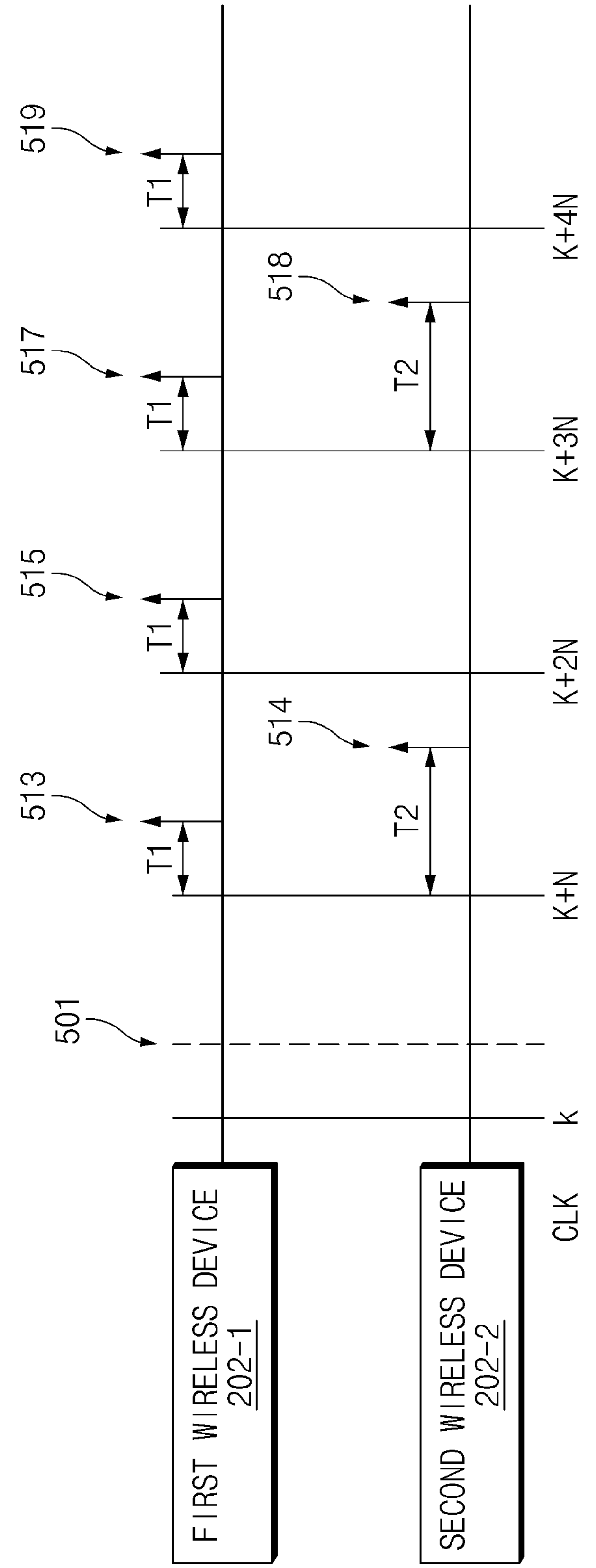

Referring to FIG. 5B, the first wireless device 202-1 and the second wireless device 202-2 may identify occurrence of the loss situation at a time point 501. In an embodiment of the disclosure, if the occurrence of the loss situation is identified, the first wireless device 202-1 and the second wireless device 202-2 may identify the advertisement scheme.

The broadcast frequency of the first wireless device 202-1 may be higher than the broadcast frequency of the second wireless device 202-2 in FIG. 5B compared to FIG. 5A. In one embodiment of the disclosure, the broadcast frequency information may indicate 2:1.

Referring to FIG. 5B, the first wireless device 202-1 may broadcast advertisement packets 513, 515, 517, and 519 at a clock after the specified timing offset T1 from anchor points (every N-$^{th}$ clock from k-$^{th}$ clock (e.g., k+N, k+2N, k+3N, k+4N)). In an embodiment of the disclosure, the second wireless device 202-2 may broadcast advertisement packets 514 and 518 at a clock after the specified timing offset T2 from anchor points (anchor points according to clocks k+N, k+3N) identified based on the broadcast frequency information among anchor points (every N-$^{th}$ clock from k-$^{th}$ clock (e.g., k+N, k+2N, k+3N, k+4N)).

Although FIG. 5B illustrates that the first wireless device 202-1 broadcasts four advertisement packets 513, 515, 517, and 519, and the second wireless device 202-2 broadcasts two advertisement packets 514 and 518, this is merely an example. In an embodiment of the disclosure, the first wireless device 202-1 and the second wireless device 202-2 may periodically broadcast an advertisement packet until a specified condition is satisfied.

Figure 5C:
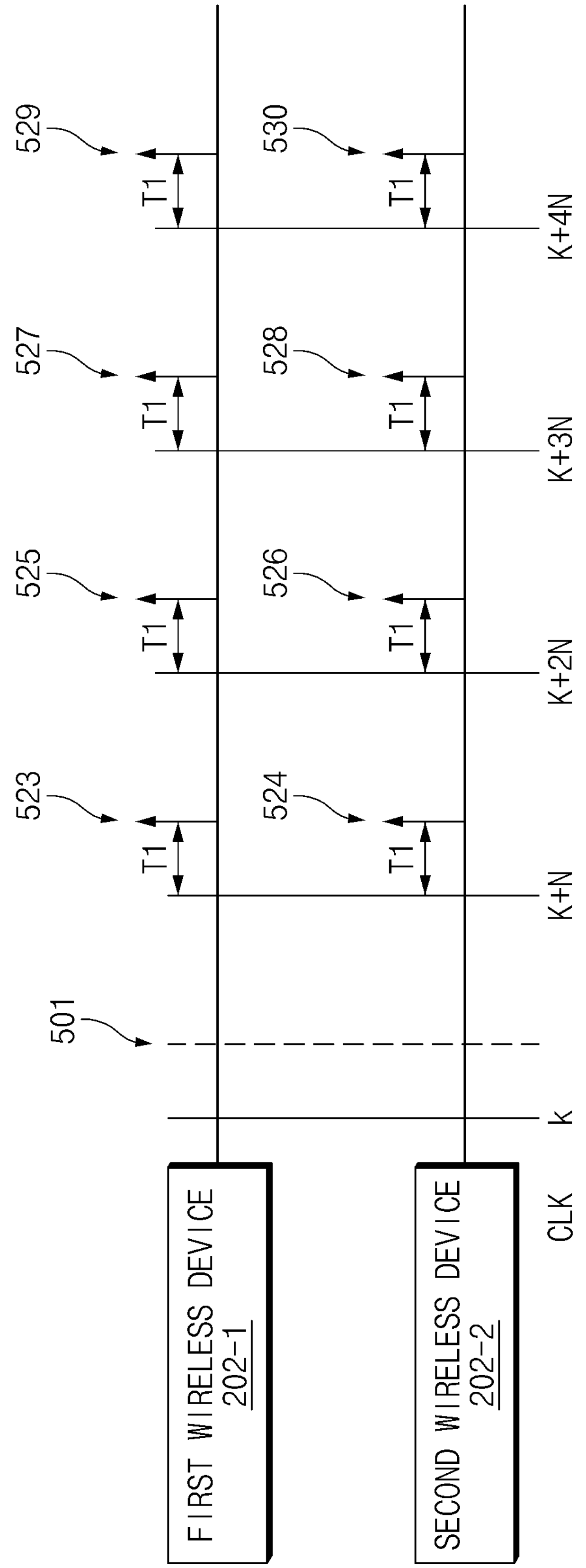

Referring to FIG. 5C, the first wireless device 202-1 and the second wireless device 202-2 may identify occurrence of the loss situation at a time point 501. In an embodiment of the disclosure, if the occurrence of the loss situation is identified, the first wireless device 202-1 and the second wireless device 202-2 may identify the advertisement scheme.

The first wireless device 202-1 and the second wireless device 202-2 may have the same timing offset T1 in FIG. 5C compared to FIG. 5A.

Referring to FIG. 5C, the first wireless device 202-1 may broadcast advertisement packets 523, 525, 527, and 529 and the second wireless device 202-2 may transmit advertisement packets 524, 526, 528, and 530 at a clock after the specified timing offset T1 from anchor points (every N-$^{th}$ clock from k-$^{th}$ clock (e.g., k+N, k+2N, k+3N, k+4N)).

Although FIG. 5C illustrates that the first wireless device 202-1 broadcasts four advertisement packets 523, 525, 527, and 529, and the second wireless device 202-2 broadcasts four advertisement packets 524, 526, 528, and 530, this is merely an example. In an embodiment of the disclosure, the first wireless device 202-1 and the second wireless device 202-2 may periodically broadcast an advertisement packet until a specified condition is satisfied.

Figure 5D:
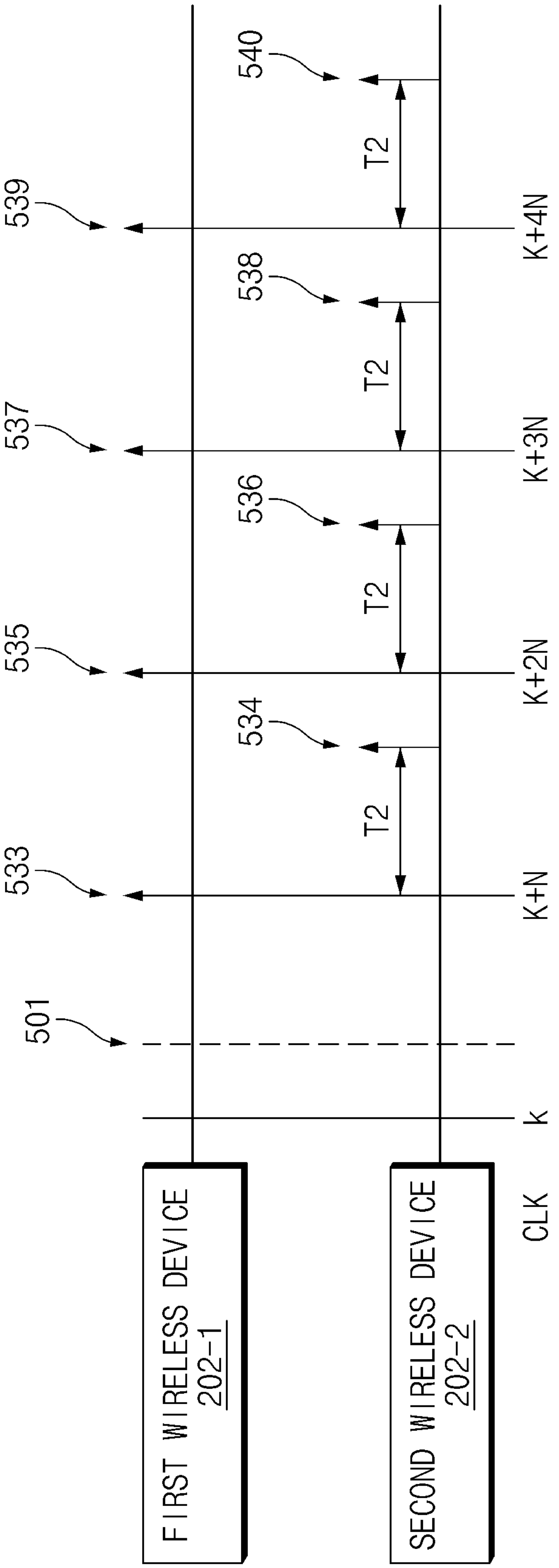

Referring to FIG. 5D, the first wireless device 202-1 and the second wireless device 202-2 may identify occurrence of the loss situation at a time point 501. In an embodiment of the disclosure, if the occurrence of the loss situation is identified, the first wireless device 202-1 and the second wireless device 202-2 may identify the advertisement scheme.

The timing offset of the first wireless device 202-1 may be 0 in FIG. 5D compared to FIG. 5A.

Referring to FIG. 5D, the first wireless device 202-1 may broadcast advertisement packets 533, 535, 537, and 539 at a clock according to anchor points (every N-$^{th}$ clock from k-$^{th}$ clock (e.g., k+N, k+2N, k+3N, k+4N)). In an embodiment of the disclosure, the second wireless device 202-2 may broadcast advertisement packets 544, 546, 548, and 550 at a clock after the specified timing offset T2 from anchor points (every N-$^{th}$ clock from k-$^{th}$ clock (e.g., k+N, k+2N, k+3N, k+4N)).

Although FIG. 5D illustrates that the first wireless device 202-1 broadcasts four advertisement packets 533, 535, 537, and 539, and the second wireless device 202-2 broadcasts four advertisement packets 534, 536, 538, and 540, this is merely an example. In an embodiment of the disclosure, the first wireless device 202-1 and the second wireless device 202-2 may periodically broadcast an advertisement packet until a specified condition is satisfied.

Figure 5E:
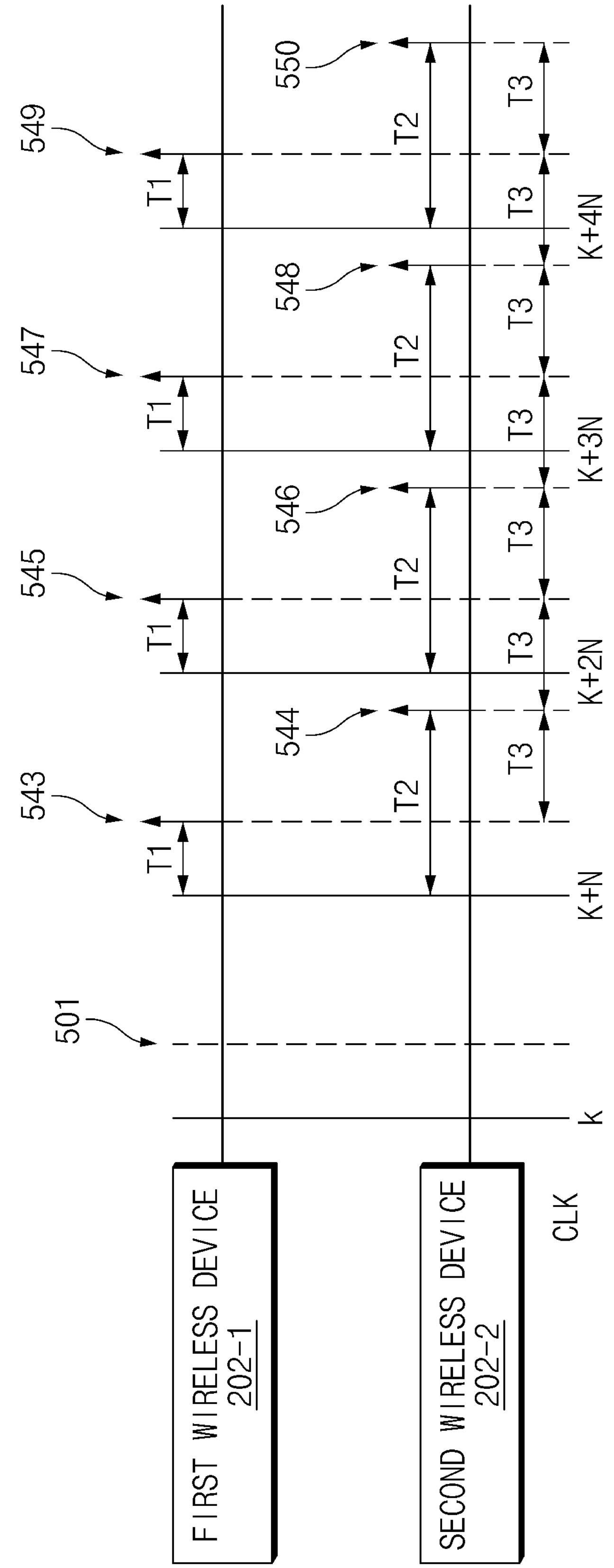

Referring to FIG. 5E, the first wireless device 202-1 and the second wireless device 202-2 may identify occurrence of the loss situation at a time point 501. In an embodiment of the disclosure, if the occurrence of the loss situation is identified, the first wireless device 202-1 and the second wireless device 202-2 may identify the advertisement scheme.

The timing offset of the second wireless device 202-2 may be configured so that time differences T3 between a broadcast time of the second wireless device 202-2 and neighboring broadcast times of the first wireless device 202-1 are the same in FIG. 5E compared to FIG. 5A.

Referring to FIG. 5E, the first wireless device 202-1 may broadcast advertisement packets 543, 545, 547, and 549 at a clock after the specified timing offset T1 from anchor points (every N-$^{th}$ clock from k-$^{th}$ clock (e.g., k+N, k+2N, k+3N, k+4N)). In an embodiment of the disclosure, the second wireless device 202-2 may broadcast advertisement packets 544, 546, 548, and 550 at a clock after the specified timing offset T2 from anchor points (every N-$^{th}$ clock from k-$^{th}$ clock (e.g., k+N, k+2N, k+3N, k+4N)). In an embodiment of the disclosure, the time difference T3 between the advertisement packet 544 and the advertisement packet 543 and the time difference T3 between the advertisement packet 544 and the advertisement packet 545 may be the same.

Although FIG. 5E illustrates that the first wireless device 202-1 broadcasts four advertisement packets 543, 545, 547, and 549, and the second wireless device 202-2 broadcasts four advertisement packets 544, 546, 548, and 550, this is merely an example. In an embodiment of the disclosure, the first wireless device 202-1 and the second wireless device 202-2 may periodically broadcast an advertisement packet until a specified condition is satisfied.

Referring back to FIG. 4, the external electronic device 204 may receive an advertisement packet of the first wireless device 202-1 and/or the second wireless device 202-2. For example, the external electronic device 204 may receive an advertisement packet of the first wireless device 202-1. For example, the external electronic device 204 may receive an advertisement packet of the second wireless device 202-2.

In an embodiment of the disclosure, the external electronic device 204 may identify, based on a received advertisement packet, information (e.g., address of the first wireless device 202-1) of a device (e.g., first wireless device 202-1) that has transmitted the advertisement packet.

In an embodiment of the disclosure, the external electronic device 204 may transmit, to the server 203, the information of the device (e.g., first wireless device 202-1) that has transmitted the advertisement packet and location information (e.g., location information of the external electronic device 204).

In an embodiment of the disclosure, the server 203 may identify the electronic device 201 based on the information of the device (e.g., first wireless device 202-1) that has transmitted the advertisement packet. In an embodiment of the disclosure, the server 203 may notify the electronic device 201 of the loss situation of a device. In an embodiment of the disclosure, the server 203 may notify the electronic device 201 of the loss situation of the device by transmitting, to the electronic device 201, the information of the device (e.g., first wireless device 202-1) that has transmitted the advertisement packet and the location information (e.g., location information of the external electronic device 204).

Figure 6:
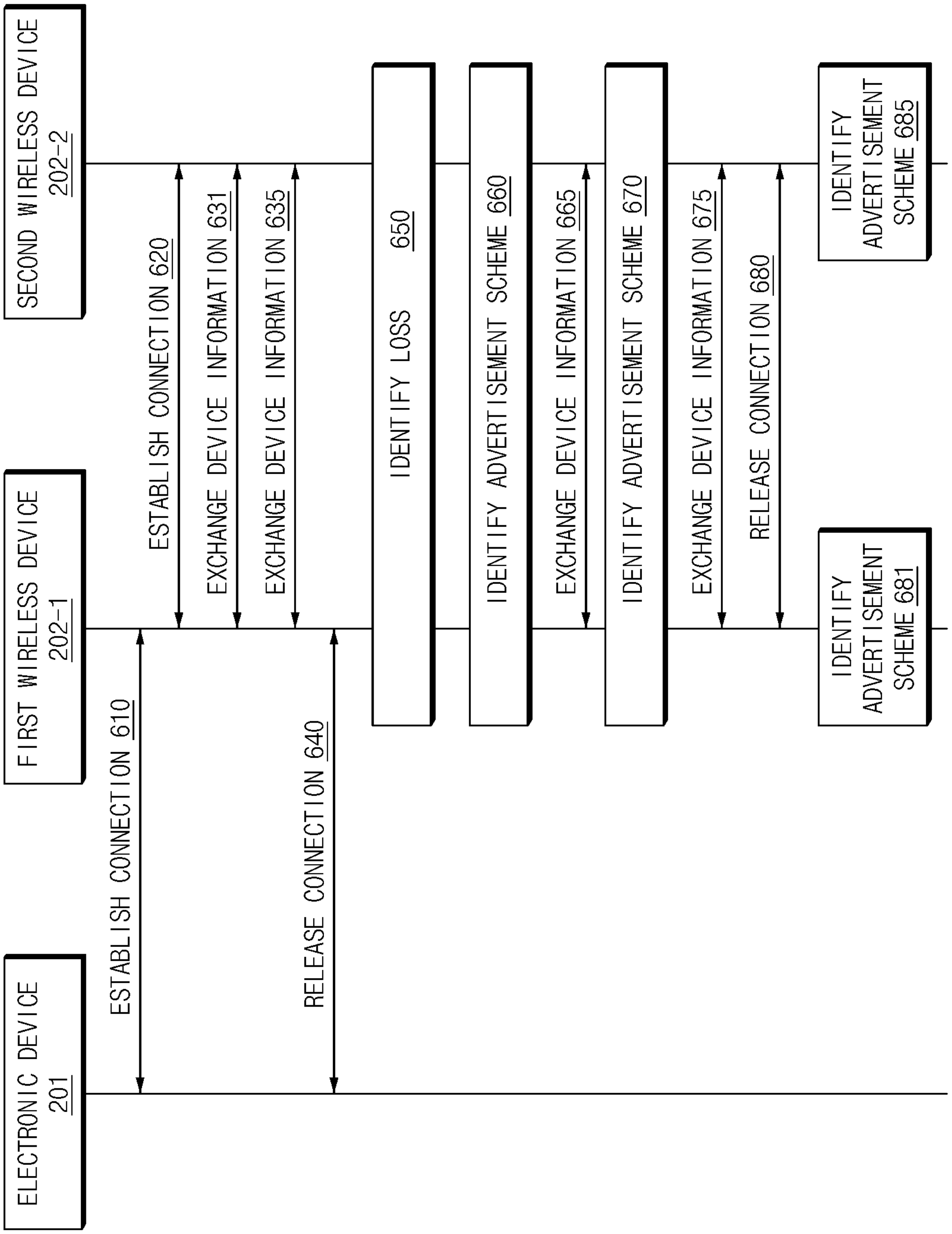
FIG. 6 is a flowchart illustrating an operation in which wireless devices identify an advertisement scheme through device information according to an embodiment of the disclosure.

FIG. 6 is a flowchart illustrating an operation in which wireless devices identify an advertisement scheme through device information according to an embodiment of the disclosure.

Referring to FIG. 6, in operation 610, the electronic device 201 and the first wireless device 202-1 may establish a connection. In an embodiment of the disclosure, the electronic device 201 and the first wireless device 202-1 may be connected via the first link 205.

Although FIG. 6 illustrates only a connection between the electronic device 201 and the first wireless device 202-1, this is merely an example. In an embodiment of the disclosure, the electronic device 201 may also establish a connection with the second wireless device 202-2. In an embodiment of the disclosure, the first wireless device 202-1 and the second wireless device 202-2 may be connected via the second link 210.

In operation 620, the first wireless device 202-1 and the second wireless device 202-2 may establish a connection. In an embodiment of the disclosure, the first wireless device 202-1 and the second wireless device 202-2 may be connected via the third link 215.

In operations 631 and 635, the first wireless device 202-1 and the second wireless device 202-2 may exchange device information. In an embodiment of the disclosure, the first wireless device 202-1 and the second wireless device 202-2 may exchange the device information based on a change in the device information. For example, in operation 635, the first wireless device 202-1 and the second wireless device 202-2 may exchange the device information if the device information is changed after operation 631.

In operation 640, the connection between the electronic device 201 and the first wireless device 202-1 may be released. In an embodiment of the disclosure, the first link 205 between the electronic device 201 and the first wireless device 202-1 may be released.

In operation 650, the first wireless device 202-1 and/or the second wireless device 202-2 may identify a loss situation.

In an embodiment of the disclosure, the first wireless device 202-1 and/or the second wireless device 202-2 may identify, as the loss situation, a situation in which the first link 205 and/or the second link 210 is released.

In an embodiment of the disclosure, the first wireless device 202-1 and/or the second wireless device 202-2 may identify, as the loss situation, a situation in which a specified time has elapsed after the first link 205 and/or the second link 210 is released.

In an embodiment of the disclosure, the first wireless device 202-1 and/or the second wireless device 202-2 may identify, as the loss situation, a situation in which the charged amount of a battery of at least one wireless device (e.g., first wireless device 202-1) among the first wireless device 202-1 and the second wireless device 202-2 is equal to or less than a specified charged amount after the first link 205 and/or the second link 210 is released.

In an embodiment of the disclosure, the first wireless device 202-1 and/or the second wireless device 202-2 may identify, as the loss situation, a situation in which charging power is not supplied from the outside (e.g., case for the first wireless device 202-1 and/or the second wireless device 202-2) for a specified time after the first link 205 and/or the second link 210 is released.

In an embodiment of the disclosure, the first wireless device 202-1 and/or the second wireless device 202-2 may identify, as the loss situation, a situation in which they are not electrically connected to the outside (e.g., case for the first wireless device 202-1 and/or the second wireless device 202-2) for a specified time after the first link 205 and/or the second link 210 is released.

In operation 660, the first wireless device 202-1 and/or the second wireless device 202-2 may identify an advertisement scheme. In an embodiment of the disclosure, the first wireless device 202-1 and/or the second wireless device 202-2 may identify the advertisement scheme based on most recently obtained device information. In an embodiment of the disclosure, the first wireless device 202-1 and/or the second wireless device 202-2 may identify the advertisement scheme based on the device information obtained according to operation 635. Thereafter, the first wireless device 202-1 and/or the second wireless device 202-2 may broadcast an advertisement packet according to the advertisement scheme.

In operation 665, the first wireless device 202-1 and the second wireless device 202-2 may exchange the device information. In an embodiment of the disclosure, the first wireless device 202-1 and the second wireless device 202-2 may exchange the device information based on a change in the device information.

In operation 670, the first wireless device 202-1 and/or the second wireless device 202-2 may identify an advertisement scheme. In an embodiment of the disclosure, the first wireless device 202-1 and/or the second wireless device 202-2 may identify the advertisement scheme based on most recently obtained device information. In an embodiment of the disclosure, the first wireless device 202-1 and/or the second wireless device 202-2 may identify the advertisement scheme based on the device information obtained according to operation 665. Thereafter, the first wireless device 202-1 and/or the second wireless device 202-2 may broadcast an advertisement packet according to the advertisement scheme.

In operation 675, the first wireless device 202-1 and the second wireless device 202-2 may exchange the device information. In an embodiment of the disclosure, the first wireless device 202-1 and the second wireless device 202-2 may exchange the device information based on a change in the device information.

In operation 680, the connection between the first wireless device 202-1 and the second wireless device 202-2 may be released.

In operation 681, the first wireless device 202-1 may identify the advertisement scheme. In an embodiment of the disclosure, the first wireless device 202-1 may identify the advertisement scheme based on the device information before the third link 215 is released. In an embodiment of the disclosure, the first wireless device 202-1 may identify the advertisement scheme based on the device information obtained according to operation 675. Thereafter, the first wireless device 202-1 may broadcast an advertisement packet according to the advertisement scheme.

In operation 685, the second wireless device 202-2 may identify the advertisement scheme. In an embodiment of the disclosure, the second wireless device 202-2 may identify the advertisement scheme based on the device information before the third link 215 is released. In an embodiment of the disclosure, the second wireless device 202-2 may identify the advertisement scheme based on the device information obtained according to operation 675. Thereafter, the second wireless device 202-2 may broadcast an advertisement packet according to the advertisement scheme.

As described above with reference to FIG. 6, the first wireless device 202-1 and/or the second wireless device 202-2 may identify the advertisement scheme based on most recently obtained device information. For example, after the third link 215 between the first wireless device 202-1 and the second wireless device 202-2 is released, the first wireless device 202-1 and/or the second wireless device 202-2 may identify the advertisement scheme based on the device information obtained immediately before the third link 215 is released.

Figure 7:
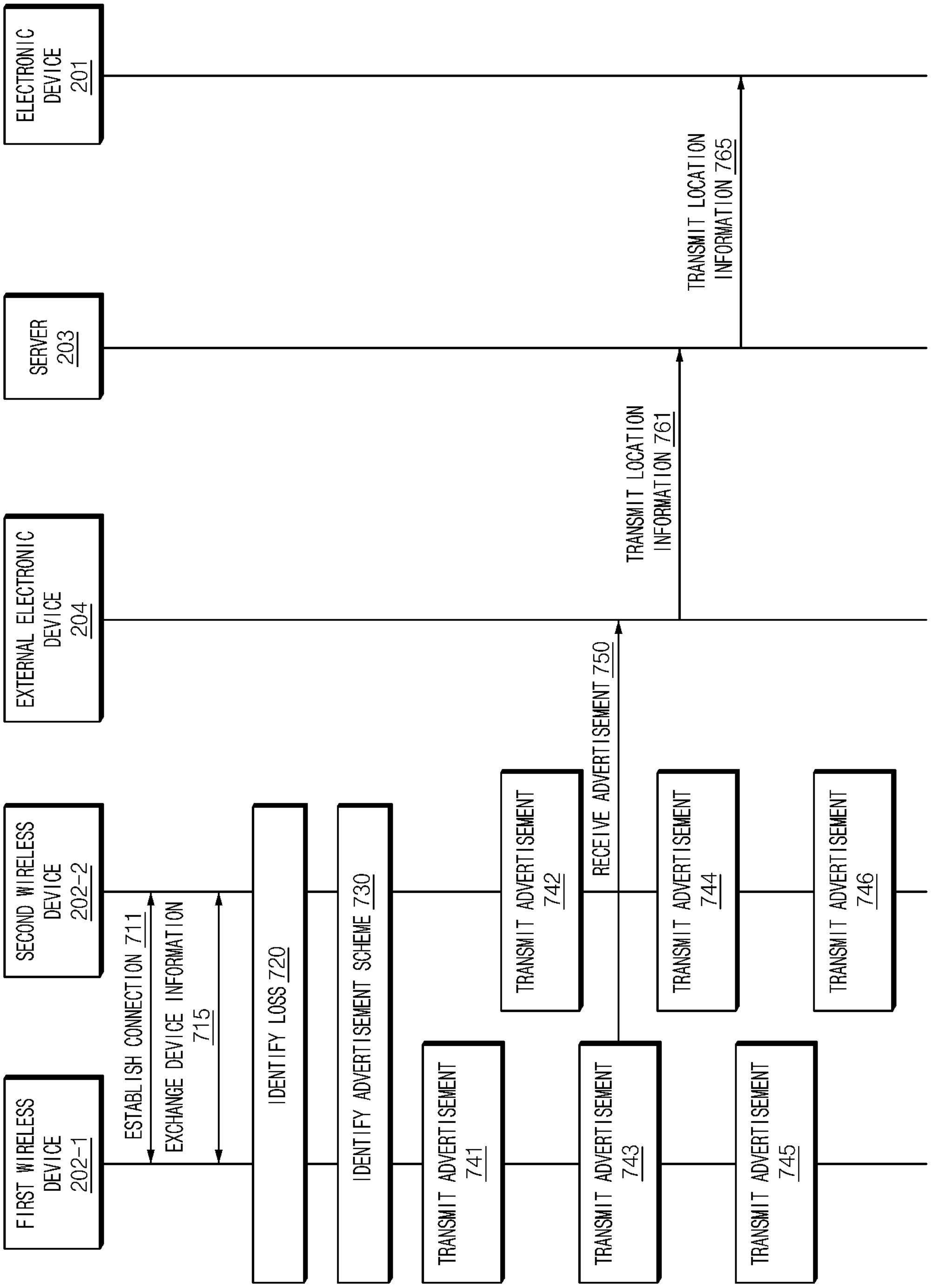
FIG. 7 is a flowchart illustrating an operation in which wireless devices broadcast an advertisement packet according to an embodiment of the disclosure.

FIG. 7 is a flowchart illustrating an operation in which wireless devices broadcast an advertisement packet according to an embodiment of the disclosure.

Referring to FIG. 7, in operation 711, the first wireless device 202-1 and the second wireless device 202-2 may establish a connection. In an embodiment of the disclosure, the first wireless device 202-1 and the second wireless device 202-2 may be connected via the third link 215.

In operation 715, the first wireless device 202-1 and the second wireless device 202-2 may exchange the device information. In an embodiment of the disclosure, the first wireless device 202-1 and the second wireless device 202-2 may exchange the device information based on a change in the device information.

In operation 720, the first wireless device 202-1 and/or the second wireless device 202-2 may identify a loss situation. In an embodiment of the disclosure, the first wireless device 202-1 and/or the second wireless device 202-2 may identify, as the loss situation, a situation in which the first link 205 and/or the second link 210 is released.

In operation 730, the first wireless device 202-1 and/or the second wireless device 202-2 may identify an advertisement scheme. In an embodiment of the disclosure, the first wireless device 202-1 and/or the second wireless device 202-2 may identify the advertisement scheme based on most recently obtained device information.

In operations 741, 743, and 745, the first wireless device 202-1 may transmit an advertisement packet. In an embodiment of the disclosure, the first wireless device 202-1 may transmit an advertisement packet based on the advertisement scheme.

In operations 742, 744, and 746, the second wireless device 202-2 may transmit an advertisement packet. In an embodiment of the disclosure, the second wireless device 202-2 may broadcast an advertisement packet based on the advertisement scheme.

In operation 750, the external electronic device 204 may receive an advertisement packet. In an embodiment of the disclosure, the external electronic device 204 may receive an advertisement packet broadcast by at least one of operation 741, 742, 743, 744, 745, or 746. For example, the external electronic device 204 may receive an advertisement packet broadcast by operation 743.

In operation 761, the external electronic device 204 may transmit location information to the server 203. In an embodiment of the disclosure, the external electronic device 204 may transmit, to the server 203, information (e.g., address of a device (e.g., first wireless device 202-1 that has transmitted an advertisement packet)) included in the advertisement packet together with the location information.

In operation 765, the server 203 may transmit the location information to the electronic device 201. In an embodiment of the disclosure, the server 203 may transmit the location information to the electronic device 201 identified based on the information included in the advertisement packet.

Figure 8:
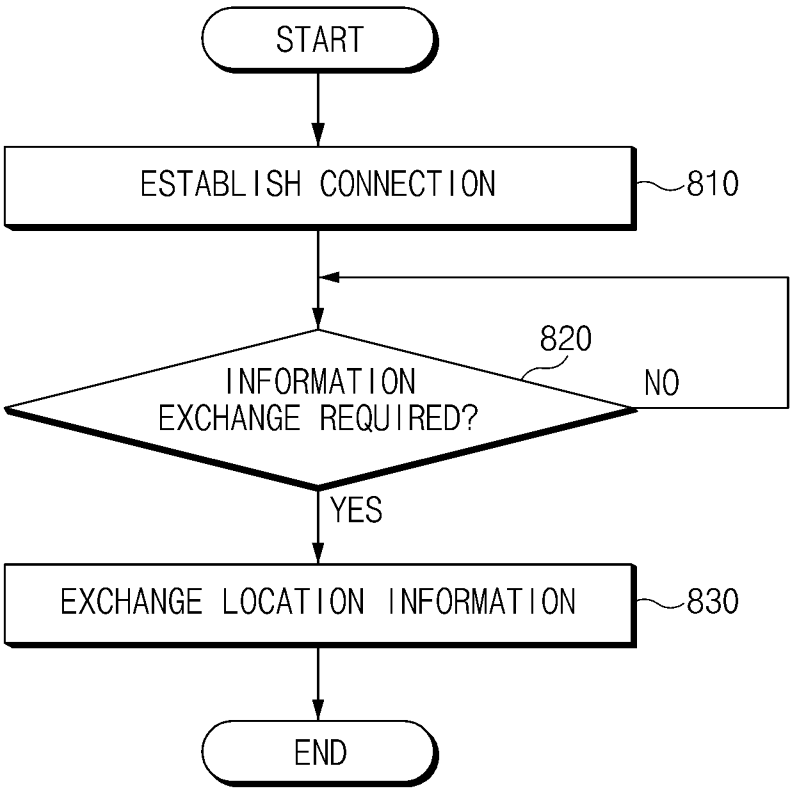
FIG. 8 is a flowchart illustrating an operation in which wireless devices identify an advertisement scheme through device information according to an embodiment of the disclosure.

FIG. 8 is a flowchart illustrating an operation in which a wireless device identifies an advertisement scheme through device information according to an embodiment of the disclosure.

The operations of FIG. 8 may be performed by the first wireless device 202-1 and/or the second wireless device 202-2. Hereinafter, it is assumed that the operations of FIG. 8 are performed by the first wireless device 202-1.

Referring to FIG. 8, in operation 810, the first wireless device 202-1 may establish a connection. In an embodiment of the disclosure, the first wireless device 202-1 may establish a connection with the second wireless device 202-2. In an embodiment of the disclosure, the first wireless device 202-1 may establish a connection with the second wireless device 202-2 in order to create the first link 205.

In operation 820, the first wireless device 202-1 may identify whether information exchange is required. In an embodiment of the disclosure, the first wireless device 202-1 may identify that information exchange is required if device information is changed. In an embodiment of the disclosure, the first wireless device 202-1 may identify that information exchange is required if battery information (e.g., charged amount) is changed. In an embodiment of the disclosure, the first wireless device 202-1 may identify that information exchange is required if received signal strength is changed. In an embodiment of the disclosure, the first wireless device 202-1 may identify that information exchange is required if a distance is changed (e.g., distance increases). In an embodiment of the disclosure, the first wireless device 202-1 may identify that information exchange is required if time information is changed.

In operation 830, the first wireless device 202-1 may exchange the device information with the second wireless device 202-2. In an embodiment of the disclosure, the device information may include battery information (e.g., charged amount), received signal strength, time information (e.g., timing, connection interval), or a combination thereof. In an embodiment of the disclosure, the received signal strength may indicate received signal strength of a packet via the third link 215. In an embodiment of the disclosure, the timing information may indicate offset information for synchronizing a clock of a slave device with a clock of a master device. In an embodiment of the disclosure, the connection interval may include information for identifying release of a link. In an embodiment of the disclosure, the connection interval may include information for identifying a packet transmission period via a link.

Figure 9:
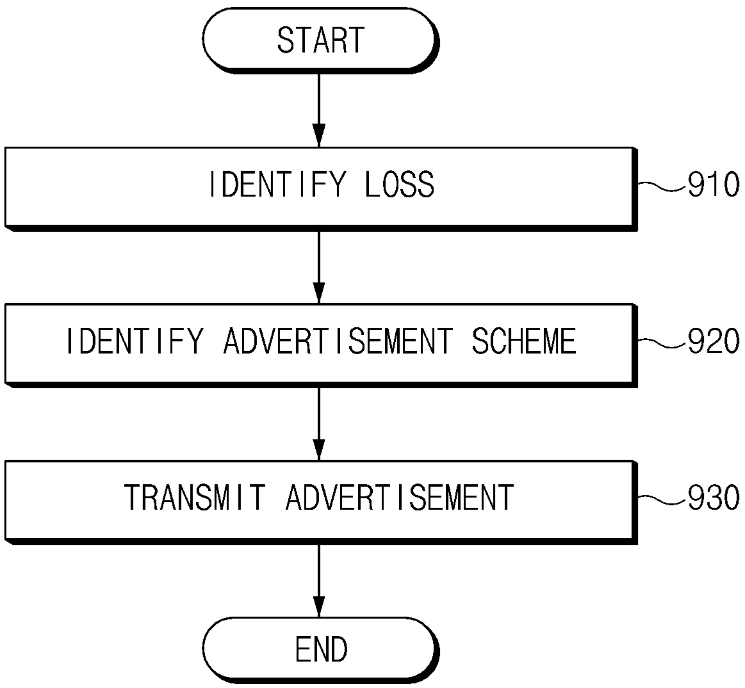
FIG. 9 is a flowchart illustrating an operation in which a wireless device broadcasts an advertisement packet according to an embodiment of the disclosure.

FIG. 9 is a flowchart illustrating an operation in which a wireless device broadcasts an advertisement packet according to an embodiment of the disclosure.

The operations of FIG. 9 may be performed by the first wireless device 202-1 and/or the second wireless device 202-2. Hereinafter, it is assumed that the operations of FIG. 9 are performed by the first wireless device 202-1.

Referring to FIG. 9, in operation 910, the first wireless device 202-1 may identify a loss situation.

In an embodiment of the disclosure, the first wireless device 202-1 may identify, as the loss situation, a situation in which a link (e.g., first link 205 and/or second link 210) with the electronic device 101 is released.

In an embodiment of the disclosure, the first wireless device 202-1 may identify, as the loss situation, a situation in which a specified time has elapsed after the first link 205 and/or the second link 210 is released.

In an embodiment of the disclosure, the first wireless device 202-1 may identify, as the loss situation, a situation in which the charged amount of a battery of at least one wireless device (e.g., first wireless device 202-1) among the first wireless device 202-1 and the second wireless device 202-2 is equal to or less than a specified charged amount after the first link 205 and/or the second link 210 is released.

In an embodiment of the disclosure, the first wireless device 202-1 may identify, as the loss situation, a situation in which charging power is not supplied from the outside (e.g., case for the first wireless device 202-1 and/or the second wireless device 202-2) for a specified time after the first link 205 and/or the second link 210 is released.

In an embodiment of the disclosure, the first wireless device 202-1 may identify, as the loss situation, a situation in which it is not electrically connected to the outside (e.g., case for the first wireless device 202-1 and/or the second wireless device 202-2) for a specified time after the first link 205 and/or the second link 210 is released.

In operation 920, the first wireless device 202-1 may identify the advertisement scheme. In an embodiment of the disclosure, the first wireless device 202-1 may identify the advertisement scheme based on most recently obtained device information.

In operation 930, the first wireless device 202-1 may transmit an advertisement packet. In an embodiment of the disclosure, the first wireless device 202-1 may transmit an advertisement packet based on the advertisement scheme.

Figure 10:
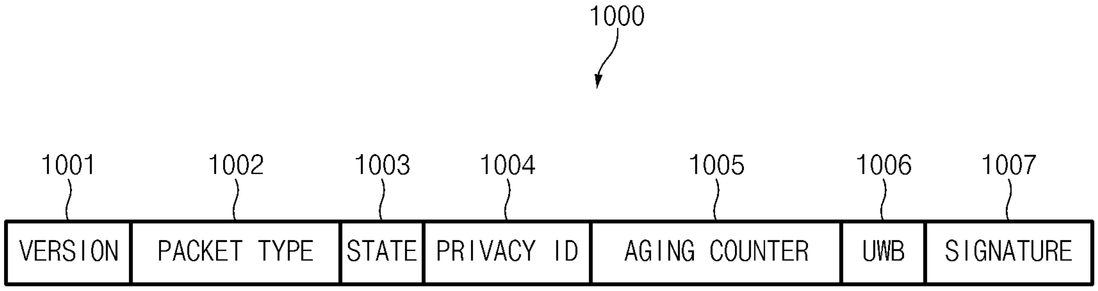
FIG. 10 illustrates an advertisement packet according to an embodiment of the disclosure.

FIG. 10 illustrates an advertisement packet according to an embodiment of the disclosure.

Referring to FIG. 10, an advertisement packet 1000 may be broadcast by the first wireless device 202-1 and/or the second wireless device 202-2. In an embodiment of the disclosure, the advertisement packet 1000 may correspond to the advertisement packets illustrated in FIGS. 5A, 5B, 5C, 5D, and/or 5E.

In an embodiment of the disclosure, the advertisement packet 1000 may include fields of a version 1001, a packet type 1002, a connection state 1003, a privacy identification (ID) 1004, an aging counter 1005, an ultra-wideband (UWB) 1006, and/or a signature 1007.

In an embodiment of the disclosure, the version 1001 may represent a version of an advertisement packet. Since an advertisement packet is required to be based on a rule shared between a wireless device (e.g., first wireless device 202-1 and/or second wireless device 202-2) that broadcasts the advertisement packet and the external electronic device 204 that receives the advertisement packet, the version of the advertisement packet may be used for the external electronic device 204 that has received the advertisement packet to determine a rule for interpreting data included in the advertisement packet. For example, when the external electronic device 204 receives an advertisement packet of an old version rather than an up-to-date version, the external electronic device 204 may interpret the advertisement packet according to a rule corresponding to the old version. For another example, when a version of the external electronic device 204 is lower than the version of an advertisement packet, the external electronic device 204 may update the version through a server.

In an embodiment of the disclosure, the packet type 1002 may indicate whether an advertisement packet is for delivering information or for requesting information. For example, when a wireless device (e.g., first wireless device 202-1 and/or second wireless device 202-2) broadcasts an advertisement packet in order to deliver information of the wireless device, the packet type 1002 may indicate a normal advertisement. When a wireless device (e.g., first wireless device 202-1 and/or second wireless device 202-2) broadcasts an advertisement packet in order to obtain information from the electronic device 201 or the server 203, the packet type 1002 may be configured to indicate a request advertisement.

In an embodiment of the disclosure, the connection state 1003 may indicate information about whether a wireless device (e.g., first wireless device 202-1 and/or second wireless device 202-2) is currently in an offline mode (e.g., offline finding) or online mode. When a wireless device (e.g., first wireless device 202-1 and/or second wireless device 202-2) is currently in the online mode, the connection state 1003 may indicate information indicating a state in which the wireless device (e.g., first wireless device 202-1 and/or second wireless device 202-2) is connected to the electronic device 201 (connected state) and indicating a channel through which the connection is being maintained. When a wireless device (e.g., first wireless device 202-1 and/or second wireless device 202-2) is currently in the offline mode, the connection state 1003 may be defined to indicate information indicating a state in which the wireless device (e.g., first wireless device 202-1 and/or second wireless device 202-2) is disconnected from the electronic device 201 (offline state) and indicating how much time has passed after the disconnection. For example, the offline mode may be classified as premature offline, offline, and overmature offline according to a time that has passed after the disconnection of a wireless device (e.g., first wireless device 202-1 and/or second wireless device 202-2).

In an embodiment of the disclosure, the privacy ID 1004 may be unique identification information of a wireless device (e.g., first wireless device 202-1 and/or second wireless device 202-2). Additionally or alternatively, the privacy ID 1004 may be a random ID generated according to a predetermined algorithm based on the unique identification information of a wireless device (e.g., first wireless device 202-1 and/or second wireless device 202-2). If the privacy ID 1004 of a wireless device (e.g., first wireless device 202-1 and/or second wireless device 202-2) is not changed, a location of the wireless device may be unwillingly tracked by another adjacent device that has recognized the privacy ID 1004, thus causing a privacy issue. Therefore, the privacy ID 1004 may be changed every specified time (e.g., 15 minutes).

In an embodiment of the disclosure, the aging counter 1005 may indicate the number of times the privacy ID 1004 has been changed after onboarding of a wireless device (e.g., first wireless device 202-1 and/or second wireless device 202-2). For example, if a wireless device (e.g., first wireless device 202-1 and/or second wireless device 202-2) changes the privacy ID 1004 at intervals of 15 minutes, the aging counter 1005 may be increased at intervals of 15 minutes based on a server time (epoch time) stored at the time of onboarding. Changing of the privacy ID 1004 and increasing of the aging counter 1005 may be performed simultaneously.

In an embodiment of the disclosure, the UWB 1006 may indicate whether a wireless device (e.g., first wireless device 202-1 and/or second wireless device 202-2) supports UWB communication. In addition to UWB, the advertisement packet 1000 may further include information for detecting whether a wireless device (e.g., first wireless device 202-1 and/or second wireless device 202-2) supports end to end (E2E) or multi core fiber (MCF).

In an embodiment of the disclosure, the signature 1007, which is a digital signature value generated using a unique key of a wireless device (e.g., first wireless device 202-1 and/or second wireless device 202-2), may indicate whether the corresponding advertisement packet is valid. The signature 1007 may be calculated in real time each time an advertisement packet is transmitted and may be added to a field of the advertisement packet.

An electronic device (e.g., first wireless device 202-1) according to an embodiment of the disclosure includes a communication module 190 that performs communication with the counterpart electronic device via a wireless link, the processor 120, and a memory 130 that stores instructions, wherein the instructions, when executed by the processor 120, cause the processor 120 to identify a first broadcast interval of a first advertisement packet and a first timing offset from a reference broadcast time point based on first device information of the electronic device (e.g., first wireless device 202-1) and second device information from the counterpart electronic device (e.g., second wireless device

202-2), and broadcast the first advertisement packet at the first transmission interval from a time point according to the first timing offset from the reference broadcast time point, wherein the reference broadcast time point is a reference time point synchronized between the electronic device and the counterpart electronic device, and the first timing offset may cause a first broadcast time point of the first advertisement packet and a second broadcast time point of a second advertisement packet of the counterpart electronic device (e.g., second wireless device 202-2) not to overlap with each other.

In an embodiment of the disclosure, the instructions, when executed by the processor 120, may be configured to cause the processor 120 to identify a second broadcast interval of the second advertisement packet and a second timing offset from the reference broadcast time point based on the first device information and the second device information, and transmit information including the second broadcast interval and the second timing offset to the counterpart electronic device (e.g., second wireless device 202-2).

In an embodiment of the disclosure, the instructions, when executed by the processor 120, may be configured to cause the processor 120 to identify a broadcast frequency between the first advertisement packet and the second advertisement packet based on the first device information and the second device information.

In an embodiment of the disclosure, the broadcast frequency may be identified based on a charged amount of a battery of the electronic device (e.g., first wireless device 202-1) included in the first device information and a charged amount of a battery of the counterpart electronic device (e.g., second wireless device 202-2) included in the second device information.

In an embodiment of the disclosure, the instructions, when executed by the processor 120, may be configured to cause the processor 120 to identify a distance between the electronic device (e.g., first wireless device 202-1) and the counterpart electronic device (e.g., second wireless device 202-2) based on the first device information and the second device information, and broadcast the first advertisement packet based on the identified distance exceeding a specified distance.

In an embodiment of the disclosure, the instructions, when executed by the processor 120, may be configured to cause the processor 120 to transmit the first device information to the counterpart electronic device (e.g., second wireless device 202-2) based on at least a change in the first device information, and receive the second device information from the counterpart electronic device (e.g., second wireless device 202-2).

In an embodiment of the disclosure, the first timing offset may be set such that a first time interval between the first broadcast time point and the second broadcast time point right before the first broadcast time point equal to a second time interval between the first broadcast time point and the second broadcast time point right after the first broadcast time point.

In an embodiment of the disclosure, the instructions, when executed by the processor 120, may be configured to cause the processor 120 to identify transmission intensity of the first advertisement packet based on a charged amount of a battery of the electronic device (e.g., first wireless device 202-1) included in the first device information.

A method for operating an electronic device (e.g., first wireless device 202-1) according to an embodiment of the disclosure may include identifying a first broadcast interval of a first advertisement packet and a first timing offset from a reference broadcast time point based on first device information of the electronic device (e.g., first wireless device 202-1) and second device information from the counterpart electronic device (e.g., second wireless device 202-2), and broadcasting the first advertisement packet at the first transmission interval from a time point according to the first timing offset from the reference broadcast time point, wherein the reference broadcast time point is a reference time point synchronized between the electronic device (e.g., first wireless device 202-1) and the counterpart electronic device (e.g., second wireless device 202-2), and the first timing offset may cause a first broadcast time point of the first advertisement packet and a second broadcast time point of a second advertisement packet of the counterpart electronic device (e.g., second wireless device 202-2) not to overlap with each other.

In an embodiment of the disclosure, the method may further include identifying a second broadcast interval of the second advertisement packet and a second timing offset from the reference broadcast time point based on the first device information and the second device information, and transmitting information including the second broadcast interval and the second timing offset to the counterpart electronic device (e.g., second wireless device 202-2).

In an embodiment of the disclosure, the method may further include identifying a broadcast frequency between the first advertisement packet and the second advertisement packet based on the first device information and the second device information.

In an embodiment of the disclosure, the broadcast frequency may be identified based on a charged amount of a battery 189 of the electronic device (e.g., first wireless device 202-1) included in the first device information and a charged amount of a battery of the counterpart electronic device (e.g., second wireless device 202-2) included in the second device information.

In an embodiment of the disclosure, the method may further include identifying a distance between the electronic device (e.g., first wireless device 202-1) and the counterpart electronic device (e.g., second wireless device 202-2) based on the first device information and the second device information, and the broadcasting of the first advertisement packet may further include broadcasting the first advertisement packet based on the identified distance exceeding a specified distance.

In an embodiment of the disclosure, the method may further include transmitting the first device information to the counterpart electronic device (e.g., second wireless device 202-2) based on at least a change in the first device information, and receiving the second device information from the counterpart electronic device (e.g., second wireless device 202-2).

In an embodiment of the disclosure, the first timing offset may be set so as to make a first time interval between the first broadcast time point and the second broadcast time point immediately before the first broadcast time point equal to a second time interval between the first broadcast time point and the second broadcast time point immediately after the first broadcast time point.

In an embodiment of the disclosure, the method may further include identifying transmission intensity of the first advertisement packet based on a charged amount of a battery of the electronic device (e.g., first wireless device 202-1) included in the first device information.

At least non-transitory computer-readable recording medium for storing one or more instructions executable by the processor 120 according to an embodiment of the disclosure may include the instructions configured to identify a first broadcast interval of a first advertisement packet and a first timing offset from a reference broadcast time point based on first device information of an electronic device (e.g., first wireless device 202-1) and second device information from a counterpart electronic device (e.g., second wireless device 202-2), and broadcast the first advertisement packet at the first transmission interval from a time point according to the first timing offset from the reference broadcast time point, wherein the reference broadcast time point is a reference time point synchronized between the electronic device (e.g., first wireless device 202-1) and the counterpart electronic device (e.g., second wireless device 202-2), and the first timing offset causes a first broadcast time point of the first advertisement packet and a second broadcast time point of a second advertisement packet of the counterpart electronic device not to overlap with each other.

In an embodiment of the disclosure, the instructions, when executed by the processor 120, may be configured to cause the processor 120 to identify a second broadcast interval of the second advertisement packet and a second timing offset from the reference broadcast time point based on the first device information and the second device information, and transmit information including the second broadcast interval and the second timing offset to the counterpart electronic device (e.g., second wireless device 202-2).

In an embodiment of the disclosure, the instructions, when executed by the processor 120, may be configured to cause the processor 120 to identify a distance between the electronic device (e.g., first wireless device 202-1) and the counterpart electronic device (e.g., second wireless device 202-2) based on the first device information and the second device information, and broadcast the first advertisement packet based on the identified distance exceeding a specified distance.

In an embodiment of the disclosure, the instructions, when executed by the processor 120, may be configured to cause the processor 120 to transmit the first device information to the counterpart electronic device (e.g., second wireless device 202-2) based on at least a change in the first device information, and receive the second device information from the counterpart electronic device (e.g., second wireless device 202-2).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

communication circuitry configured to perform communication with a counterpart electronic device via a wireless link;

memory storing instructions; and at least one processor communicatively coupled to the communication circuitry and the memory, wherein the instructions, when executed by the at least one processor individually or collectively, cause the electronic device to:

receive a signal from the counterpart electronic device, in case that a strength of the signal received from the counterpart electronic device is less than a threshold, cause one of the electronic device or the counterpart electronic device to periodically broadcast an advertising packet, and in case that the strength of the signal received from the counterpart electronic device is greater than or equal to the threshold, identify a first broadcast interval of a first advertisement packet and a first timing offset for a reference broadcast time point based on first device information of the electronic device and second device information from the counterpart electronic device, broadcast the first advertisement packet by the first broadcast interval from a time point according to the first timing offset from the reference broadcast time point, and cause the counterpart electronic device to broadcast a second advertisement packet by the first broadcast interval, wherein the reference broadcast time point is a reference time point synchronized between the electronic device and the counterpart electronic device, and wherein the first timing offset causes a first broadcast time point of the first advertisement packet and a second broadcast time point of a second advertisement packet of the counterpart electronic device not to overlap with each other.

2. The electronic device of claim 1, wherein the instructions, when executed by the at least one processor individually or collectively, further cause the electronic device to:

identify a second broadcast interval of the second advertisement packet and a second timing offset from the reference broadcast time point based on the first device information and the second device information; and transmit information including the second broadcast interval and the second timing offset to the counterpart electronic device.

3. The electronic device of claim 2, wherein the instructions, when executed by the at least one processor individually or collectively, further cause the electronic device to:

identify a broadcast frequency between the first advertisement packet and the second advertisement packet based on the first device information and the second device information.

4. The electronic device of claim 3, wherein the broadcast frequency is identified based on a charged amount of a battery of the electronic device included in the first device information and a charged amount of a battery of the counterpart electronic device included in the second device information.

5. The electronic device of claim 1, wherein the instructions, when executed by the at least one processor individually or collectively, further cause the electronic device to:

identify a distance between the electronic device and the counterpart electronic device based on the first device information and the second device information; and broadcast the first advertisement packet based on the identified distance exceeding a specified distance.

6. The electronic device of claim 1, wherein the instructions, when executed by the at least one processor individually or collectively, further cause the electronic device to:

transmit the first device information to the counterpart electronic device based on at least a change in the first device information; and receive the second device information from the counterpart electronic device.

7. The electronic device of claim 1, wherein the first timing offset is set so as to make a first time interval between the first broadcast time point and the second broadcast time point immediately before the first broadcast time point equal to a second time interval between the first broadcast time point and the second broadcast time point immediately after the first broadcast time point.

8. The electronic device of claim 1, wherein the instructions, when executed by the at least one processor individually or collectively, further cause the electronic device to:

identify a transmission intensity of the first advertisement packet based on a charged amount of a battery of the electronic device included in the first device information.

9. A method performed by an electronic device, the method comprising:

receiving a signal from a counterpart electronic device;

in case that a strength of the signal received from the counterpart electronic device is less than a threshold, causing one of the electronic device or the counterpart electronic device to periodically broadcast an advertising packet; and in case that the strength of the signal received from the counterpart electronic device is greater than or equal to the threshold, identifying a first broadcast interval of a first advertisement packet and a first timing offset for a reference broadcast time point based on first device information of the electronic device and second device information from the counterpart electronic device, broadcasting the first advertisement packet at the first broadcast interval from a time point according to the first timing offset from the reference broadcast time point, and causing the counterpart electronic device to broadcast a second advertisement packet by the first broadcast interval, wherein the reference broadcast time point is a reference time point synchronized between the electronic device and the counterpart electronic device, and wherein the first timing offset causes a first broadcast time point of the first advertisement packet and a second broadcast time point of a second advertisement packet of the counterpart electronic device not to overlap with each other.

10. The method of claim 9, further comprising:

identifying a second broadcast interval of the second advertisement packet and a second timing offset from the reference broadcast time point based on the first device information and the second device information; and transmitting information including the second broadcast interval and the second timing offset to the counterpart electronic device.

11. The method of claim 10, further comprising:

identifying a broadcast frequency between the first advertisement packet and the second advertisement packet based on the first device information and the second device information.

12. The method of claim 11, wherein the broadcast frequency is identified based on a charged amount of a battery of the electronic device included in the first device information and a charged amount of a battery of the counterpart electronic device included in the second device information.

13. The method of claim 9, further comprising:

identifying a distance between the electronic device and the counterpart electronic device based on the first device information and the second device information, wherein the broadcasting of the first advertisement packet further includes broadcasting the first advertisement packet based on the identified distance exceeding a specified distance.

14. The method of claim 9, further comprising:

transmitting the first device information to the counterpart electronic device based on at least a change in the first device information; and receiving the second device information from the counterpart electronic device.

15. The method of claim 9, wherein the first timing offset is set so as to make a first time interval between the first broadcast time point and the second broadcast time point immediately before the first broadcast time point equal to a second time interval between the first broadcast time point and the second broadcast time point immediately after the first broadcast time point.

16. The method of claim 9, further comprising:

identifying a transmission intensity of the first advertisement packet based on a charged amount of a battery of the electronic device included in the first device information.

17. The method of claim 9, wherein the signal received from the counterpart electronic device is received over a wireless link between the electronic device and the counterpart electronic device.

* * * * *